United States Patent
Kawakami

(10) Patent No.: US 11,321,094 B2
(45) Date of Patent: May 3, 2022

(54) NON-TRANSITORY COMPUTER-READABLE MEDIUM, ASSEMBLY INSTRUCTION CONVERSION METHOD AND INFORMATION PROCESSING APPARATUS

(71) Applicant: FUJITSU LIMITED, Kawasaki (JP)

(72) Inventor: Kentaro Kawakami, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 17/210,559

(22) Filed: Mar. 24, 2021

(65) Prior Publication Data

US 2022/0027161 A1  Jan. 27, 2022

(30) Foreign Application Priority Data

Jul. 22, 2020 (JP) .............................. JP2020-125185

(51) Int. Cl.
| | | |
|---|---|---|
| G06F 9/44 | (2018.01) | |
| G06F 9/38 | (2018.01) | |
| G06F 9/30 | (2018.01) | |
| G06F 9/455 | (2018.01) | |
| G06F 8/41 | (2018.01) | |

(52) U.S. Cl.
CPC .......... *G06F 9/3838* (2013.01); *G06F 8/4441* (2013.01); *G06F 9/30098* (2013.01); *G06F 9/4552* (2013.01)

(58) Field of Classification Search
None
See application file for complete search history.

(56) References Cited

U.S. PATENT DOCUMENTS

| 7,337,438 B1* | 2/2008 | Dobbins | G06F 8/447 717/141 |
|---|---|---|---|
| 9,361,458 B1* | 6/2016 | Feng | G06F 21/564 |
| 2005/0235270 A1* | 10/2005 | Sanyal | G06F 8/433 717/136 |
| 2014/0115568 A1* | 4/2014 | Maurio | G06F 8/41 717/146 |
| 2015/0277866 A1* | 10/2015 | Wang | G06F 9/45516 717/148 |

FOREIGN PATENT DOCUMENTS

| JP | S63-138427 A | 6/1988 |
|---|---|---|
| JP | H04-353923 A | 12/1992 |

* cited by examiner

*Primary Examiner* — Qamrun Nahar
(74) *Attorney, Agent, or Firm* — Fujitsu Patent Center

(57) ABSTRACT

A non-transitory computer-readable medium having stored therein a program for causing a computer to execute a process. The process includes storing a plurality of generation instructions in a storage area for each of a plurality of first assembly instructions, each generation instruction instructing the generation of a machine language of a second assembly instruction that executes processing equivalent to each first assembly instruction, and generating machine languages of a plurality of second assembly instructions so that the machine languages of the second assembly instructions having a dependency relationship do not appear adjacent to each other, according to the plurality of generation instructions in the storage area.

12 Claims, 26 Drawing Sheets

FIG. 1

```
void vpmovsxbd(xmm(i), xmm(j)) {
  /* PROCESSING THAT GENERATES MACHINE LANGUAGE OF INSTRUCTION
     "vpmovsxbd, xmm(i), xmm(j)" OF x86_64 */
  ...
}                                                              1d void generateJitCode() {
  for(int i=0; i<16; i++) {
    vpmovsxbd(xmm(i), xmm(i));
  }                          1c
  ...
}      1a void main() {
  generateJitCode();  /* GENERATE DESIRED
                         MACHINE LANGUAGE SEQUENCE */
  executeJitCode();   /* EXECUTE GENERATED
                         MACHINE LANGUAGE SEQUENCE */
}
```

1b — generateJitCode();
1f — executeJitCode();

1e:
```
vpmovsxbd xmm0,  xmm0
vpmovsxbd xmm1,  xmm1
...
vpmovsxbd xmm15, xmm15
```

FIG. 11

```
void generateJitCode() {
    for(int i=0; i<4; i++) {          ~37
        vpmovsxbd(xmm(i), xmm(i));
    }
    ret();        ~33
}
void main() {
    generateJitCode();      /* GENERATE DESIRED MACHINE LANGUAGE SEQUENCE */
    genJitCodeOfFifo();     /* TRANSLATE AND GENERATE MACHINE LANGUAGE OF INSTRUCTION REMAINING IN FIFO */
    executeJitCode();       /* EXECUTE GENERATED MACHINE LANGUAGE SEQUENCE */
}
```

38 — for loop line
51 — ret()
34 — generateJitCode()
35 — genJitCodeOfFifo()
36 — executeJitCode()
32 — overall block

FIG. 12

```
class XmmReg {
    int index;
}
class VRegB16 {
    int index;
}                                    ---43
class VRegH8 {
    int index;
}
class VRegS4 {
    int index;
}
                            38
void vpmovsxbd(XmmReg dst, XmmReg src) {
```

39 -- if(TYPE OF ASSEMBLY INSTRUCTION INDICATING GENERATION INSTRUCTION IN FIFO BUFFER IS DIFFERENT FROM TYPE OF MNEMONIC FUNCTION vpmovsxbd) {

35 -- genJitCodeOfFifo();
} else {

40 -- STORE GENERATION INSTRUCTION OF ASSEMBLY INSTRUCTION "vpmovsxbd dst, src" IN FIFO BUFFER
}
}

```
                          51
                          ,
    void ret(XmmReg dst, XmmReg src) { if(TYPE OF ASSEMBLY INSTRUCTION INDICATED BY
    52 ---   GENERATION INSTRUCTION IN FIFO BUFFER IS
             DIFFERENT FROM TYPE OF MNEMONIC FUNCTION ret) {

35 --- genJitCodeOfFifo();
        } else {

STORE GENERATION INSTRUCTION OF ASSEMBLY
    53 --- INSTRUCTION "ret" IN FIFO BUFFER
        }
    }
```

FIG. 15

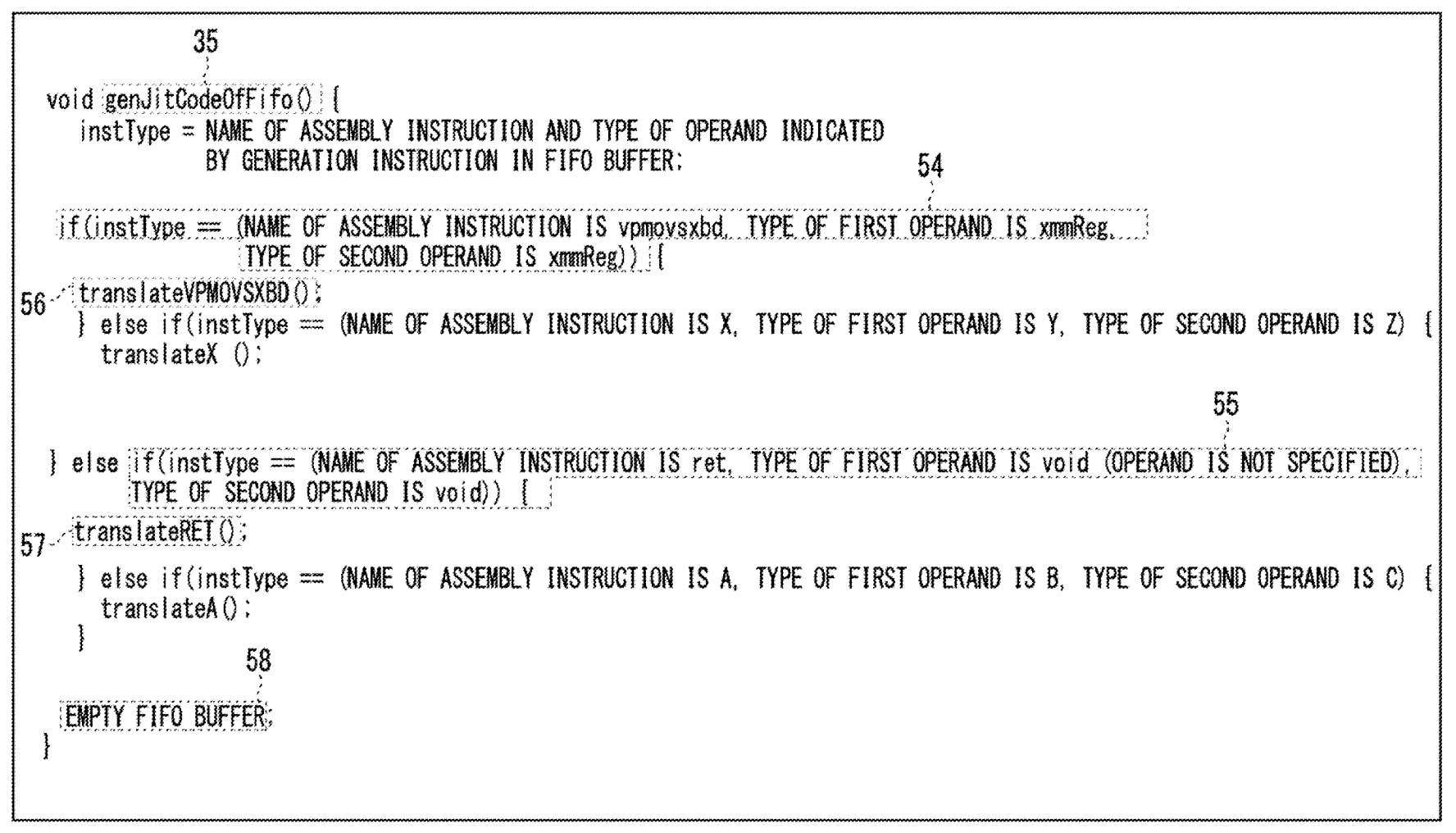

```
                                                                35
void genJitCodeOfFifo() {
    instType = NAME OF ASSEMBLY INSTRUCTION AND TYPE OF OPERAND INDICATED
              BY GENERATION INSTRUCTION IN FIFO BUFFER;
                                                                  54
    if(instType == (NAME OF ASSEMBLY INSTRUCTION IS vpmovsxbd, TYPE OF FIRST OPERAND IS xmmReg,
                   TYPE OF SECOND OPERAND IS xmmReg)) {
56      translateVPMOVSXBD();                                                               55
    } else if(instType == (NAME OF ASSEMBLY INSTRUCTION IS X, TYPE OF FIRST OPERAND IS Y, TYPE OF SECOND OPERAND IS Z) {
        translateX();
    } else if(instType == (NAME OF ASSEMBLY INSTRUCTION IS ret, TYPE OF FIRST OPERAND IS void (OPERAND IS NOT SPECIFIED),
             TYPE OF SECOND OPERAND IS void)) {
57      translateRET();
    } else if(instType == (NAME OF ASSEMBLY INSTRUCTION IS A, TYPE OF FIRST OPERAND IS B, TYPE OF SECOND OPERAND IS C) {
        translateA();
    }
        58
    EMPTY FIFO BUFFER;
}
```

FIG. 16

```
                      56
void translateVPMOVSXBD() { // ARGUMENT IS ARRAY OF xmmReg TYPE
  int num = NUMBER OF GENERATION INSTRUCTIONS IN FIFO BUFFER;         61 for(int i=0; i<num; i++) {
    VRegB16 vB16;
    VRegH8 vH8;       63
                              64 vB16.index = index OF SECOND OPERAND OF i-TH GENERATION
                 INSTRUCTION IN FIFO BUFFER;
    vH8.index  = index OF FIRST OPERAND OF i-TH GENERATION
                 INSTRUCTION IN FIFO BUFFER;

/* MNEMONIC FUNCTION FOR Armv8-A THAT GENERATES MACHINE LANGUAGES
       THAT EXTEND 8-BIT DATA STORED IN LOWER 8 ELEMENTS TO 16-BIT DATA
       AMONG 16 PIECES OF 8-BIT DATA IN VECTOR REGISTERS OF REGISTER NUMBERS
       REPRESENTED BY vB16.index, AND STORES THEM IN VECTOR REGISTERS OF
       REGISTER NUMBERS REPRESENTED BY vH8.index */ sxtl(vH8, vB16);
  }           65 for(int i=0; i<num; i++) {
    VRegH8 vH8;
    VRegS4 vS4;       66
                              67 vH8.index = index OF SECOND OPERAND OF i-TH GENERATION
                INSTRUCTION IN FIFO BUFFER;
    vS4.index = index OF FIRST OPERAND OF i-TH GENERATION
                INSTRUCTION IN FIFO BUFFER;

/* MNEMONIC FUNCTION FOR Armv8-A THAT GENERATES MACHINE LANGUAGES
       THAT EXTEND 16-BIT DATA STORED IN LOWER 4 ELEMENTS TO 32-BIT DATA
       AMONG 8 PIECES OF 16-BIT DATA IN VECTOR REGISTERS OF REGISTER NUMBERS
       REPRESENTED BY vH8.index, AND STORES THEM IN VECTOR REGISTERS OF
       REGISTER NUMBERS REPRESENTED BY vS4.index */ sxtl(vS4, vH8);
  }           68
}
                                                              62
```

FIG. 17

```
void translateRET(void operand0List[], void operand1List[])
{ // ARGUMENT IS ARRAY OF void TYPE
int num = NUMBER OF GENERATION INSTRUCTIONS IN FIFO BUFFER;

for(int i=0; i<num; i++) {
    /* MNEMONIC FUNCTION FOR Armv8-A THAT GENERATES MACHINE LANGUAGES
       OF ret INSTRUCTIONS OF Armv8-A */
    ret_Armv8a();
}
}
```

```
void generateJitCode() {          -- 34
  insertDummyStart();             -- 81
  for (int i=0; i<4; i++) {       -- 37
    vpmovsxbd(xmm(i), xmm(i));
  }                                -- 38
  insertDummyEnd();               -- 82
  ret();                          -- 51
}
void main() {                     -- 33
  generateJitCode();   /* GENERATE DESIRED MACHINE LANGUAGE SEQUENCE */  -- 34
  reorderJitCode();    /* REORDER MACHINE LANGUAGE SEQUENCE */           -- 83
  executeJitCode();    /* EXECUTE GENERATED MACHINE LANGUAGE SEQUENCE */ -- 36
}
```

| 85a | 85c | 85c | 85c | 85c | 85c | 85c | 85c | 85c | 85b | 85d |
|---|---|---|---|---|---|---|---|---|---|---|
| 0xABCDEFG0 | 0xC0000000 | 0xC1000000 | 0xC0001001 | 0xC1001001 | 0xC0002002 | 0xC1002002 | 0xC0003003 | 0xC1003003 | 0xABCDEFG1 | 0xF0000000 |

85 ↙

| NUMBER | | |
|---|---|---|
| | | MACHINE LANGUAGE OF insertDummyStart() |
| 0 | sxtl | v0.h8, v0.b16 |
| 1 | sxtl | v0.s4, v0.h8 |
| 2 | sxtl | v1.h8, v1.b16 |
| 3 | sxtl | v1.s4, v1.h8 |
| 4 | sxtl | v2.h8, v2.b16 |
| 5 | sxtl | v2.s4, v2.h8 |
| 6 | sxtl | v3.h8, v3.b16 |
| 7 | sxtl | v3.s4, v3.h8 |
| | | MACHINE LANGUAGE OF insertDummyEnd() |
| | | MACHINE LANGUAGES OF ret() OF Armv8-A |

⇧ REORDERING

| 85c | 85c | 85c | 85c | 85c | 85c | 85c | 85c | 85d |
|---|---|---|---|---|---|---|---|---|
| 0xC0000000 | 0xC0001001 | 0xC0002002 | 0xC0003003 | 0xC1000000 | 0xC1001001 | 0xC1002002 | 0xC1003003 | 0xF0000000 |

85 ↙

| NUMBER | | |
|---|---|---|
| 0 | sxtl | v0.h8, v0.b16 |
| 2 | sxtl | v1.h8, v1.b16 |
| 4 | sxtl | v2.h8, v2.b16 |
| 6 | sxtl | v3.h8, v3.b16 |
| 1 | sxtl | v0.s4, v0.h8 |
| 3 | sxtl | v1.s4, v1.h8 |
| 5 | sxtl | v2.s4, v2.h8 |
| 7 | sxtl | v3.s4, v3.h8 |
| | | MACHINE LANGUAGES OF ret() OF Armv8-A |

EXECUTION ORDER →

NON-TRANSITORY COMPUTER-READABLE MEDIUM, ASSEMBLY INSTRUCTION CONVERSION METHOD AND INFORMATION PROCESSING APPARATUS

CROSS-REFERENCE TO RELATED APPLICATION

This application is based upon and claims the benefit of priority of the prior Japanese Patent Application No. 2020-125185 filed on Jul. 22, 2020, the entire contents of which are incorporated herein by reference.

FIELD

A certain aspect of the embodiments is related to a non-transitory computer-readable medium, an assembly instruction conversion method and an information processing apparatus.

BACKGROUND

JIT (Just In Time) compiler technology is one of the technologies to increase an execution speed of programs. The JIT compiler technology is a technology that generates a suitable machine language instruction sequence at the time of program execution according to parameters determined at the time of execution, processing contents, and a status of a processor. The machine language instruction sequence generated using the JIT compiler technology is faster in processing than an execution program including general-purposely processable machine language instruction sequences generated by an AOT (Ahead Of Time) type compiler.

However, since the machine language generated by the JIT compiler technology is a machine language of the assembly instruction included in an instruction set of a target processor, it does not work on another processor that executes the machine language of another instruction set. When the machine language generated by the JIT compiler technology is converted into the machine language of another instruction set, the execution program that can be operated by a processor that adopts the another instruction set can be obtained.

However, simply converting the machine language in this way may increase the number of clock cycles when the execution program is executed compared to before the conversion. Note that the technique related to the present disclosure is disclosed in Japanese Laid-open Patent Publications No. S63-138427 and No. H04-353923.

SUMMARY

According to an aspect of the present disclosure, there is provided a non-transitory computer-readable medium having stored therein a program for causing a computer to execute a process, the process including storing a plurality of generation instructions in a storage area for each of a plurality of first assembly instructions, each generation instruction instructing the generation of a machine language of a second assembly instruction that executes processing equivalent to each first assembly instruction, and generating machine languages of a plurality of second assembly instructions so that the machine languages of the second assembly instructions having a dependency relationship do not appear adjacent to each other, according to the plurality of generation instructions in the storage area.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 illustrates a pseudo source code described by C++ that is supposed to be compiled with the JIT compiler technology;

FIG. 11 is a schematic diagram of a pseudo source code described by C++ of an assembly instruction conversion program according to the first embodiment;

FIG. 12 is a schematic diagram of a pseudo source code described by C++ illustrating an example of the definition of a vpmovsxbd function according to the first embodiment;

FIG. 15 is a schematic diagram of a pseudo source code described by C++ illustrating an example of the definition of a genJitCodeOfFifo function according to the first embodiment;

FIG. 16 is a schematic diagram of a pseudo source code described by C++ illustrating an example of the definition of a translateVPMOVSXBD function according to the first embodiment;

FIG. 17 is a schematic diagram of a pseudo source code described by C++ illustrating an example of the definition of a translateRET function according to the first embodiment;

FIG. 22 is a schematic diagram of a pseudo source code described by C++ of the assembly instruction conversion program according to the second embodiment;

FIG. 24 is a schematic diagram illustrating a method of reordering the machine language sequence by the reorderJitCode function according to the second embodiment;

DESCRIPTION OF EMBODIMENTS

Figure 2A:
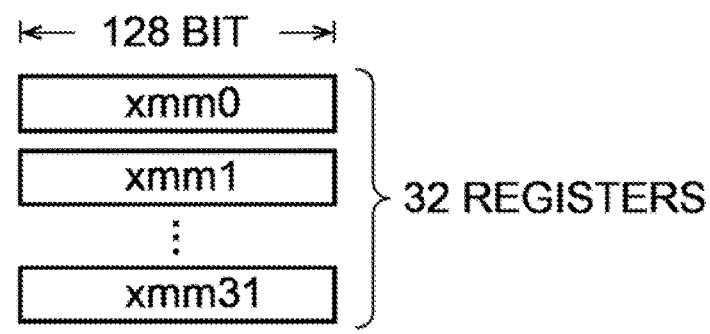
FIG. 2A is a schematic diagram for explaining vector registers in an x86_64 architecture.

Prior to the description of the present embodiment, matters underlying the present embodiment will be described.

FIG. 1 illustrates a pseudo source code described by C++ that is supposed to be compiled with the JIT compiler technology.

In a source code 1, a generateJitCode function 1b is called by executing a main function 1a. The generateJitCode function 1b is a function that calls a vpmovsxbd function 1c therein.

The vpmovsxbd function 1c is a function that generates a machine language of an assembly instruction "vpmovsxbd" included in an instruction set of an x86_64 architecture of Intel Corporation, as defined in a code 1d. Hereinafter, a function that generates the machine language of a certain assembly instruction in this way and has a same function name as the name of the assembly instruction is referred to as a mnemonic function.

In this example, by executing the generateJitCode function 1b, the machine languages of the assembly instructions that are "vpmovsxbd xmm0, xmm0", "vpmovsxbd xmm1, xmm1", ..., "vpmovsxbd xmm15, xmm15" as illustrated by a code 1e are generated.

Then, an executeJitCode function 1f in the main function 1a executes the machine language sequence generated by the vpmovsxbd function 1e.

FIG. 2A is a schematic diagram for explaining vector registers in an x86_64 architecture.

As illustrated in FIG. 2A, a total of 32 128-bit SIMD (Single Instruction Multiple Data) registers are prepared as vector registers in a processor adopting the x86_64 architecture. The names of the vector registers are "xmm0", "xmm1", ... "xmm31". Each of numerical portions such as "0", "1", ... "31" in the name indicate a register number, in an argument of the mnemonic function, each vector register is identified by "xmm (i)" (0≤i≤15) as illustrated in FIG. 1.

Figure 2B:
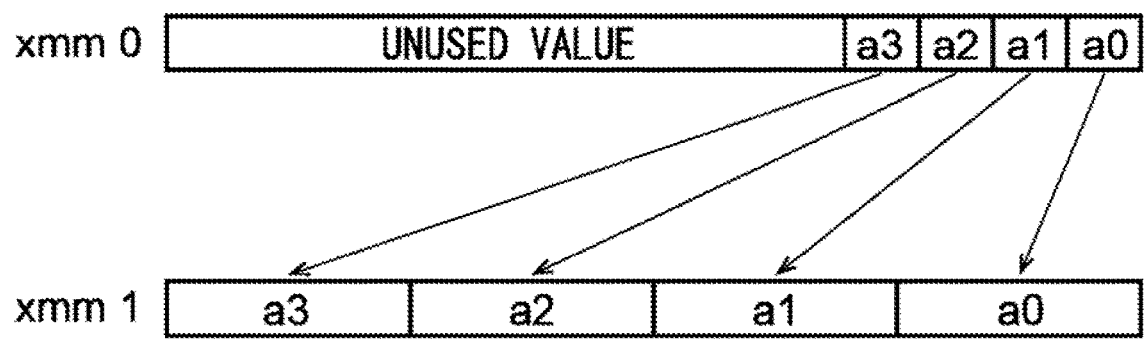
FIG. 2B is a schematic diagram for explaining an assembly instruction "vpmovsxbd"

FIG. 2B is a schematic diagram for explaining the above-mentioned assembly instruction "vpmovsxbd".

The assembly instruction "vpmovsxbd" is an instruction for sign-extending 8-bit data stored in each of four lower elements of the vector register to 32 bits. For example, "vpmovsxpd xmm1, xmm0" sign-extends 8-bit data a0 to a3 stored in the lower four elements of the vector register xmm0 to 32 bits, and stores them in the four elements of the vector register xmm1.

In this way, the machine language of the assembly instruction "vpmovsxbd" generated by the source code 1 of FIG. 1 is a machine language that operates on the processor of the x86_64 architecture. Therefore, a processor of an architecture different from the x86_64 architecture cannot execute this machine language.

However, if the source code 1 for the x86_64 architecture is already in the hands of a developer, program resources can be effectively utilized by enabling the source code 1 to be executed by the processor of another architecture. Such an architecture is, for example, an Armv8-A architecture of ARM Holdings.

Therefore, the following considers replacing the "vpmovsxbd" instruction which is an assembly instruction of the x86_64 architecture with an equivalent assembly instruction of the Armv8-A architecture.

Figure 3A:
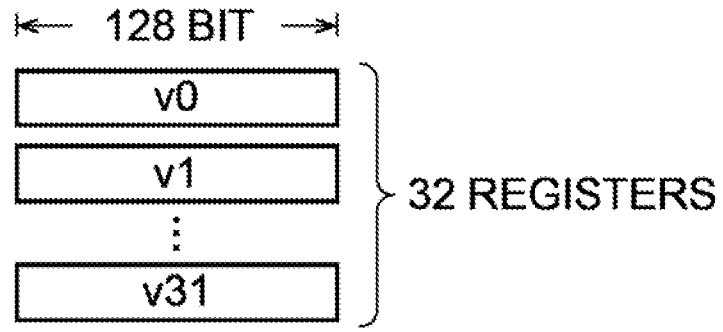
FIG. 3A is a schematic diagram for explaining vector registers in an Armv8-A architecture.

FIG. 3A is a schematic diagram for explaining vector registers in a processor adopting the Armv8-A architecture.

As illustrated in FIG. 3A, a total of 32 128-bit SIMD registers are prepared as the vector registers also in the Armv8-A architecture. However, the names of the vector registers are different from those in the x86_64 architecture and are "v0", "v1", ... "v31". Each of the numerical portions such as "0", "1", ... "31" in the names indicate the register number. Hereinafter, tire x86_64 architecture may be simply referred to as "x86_64" and the Armv8-A architecture may be simply referred to as "Armv8-A". It is said that the vector registers of x86_64 and Armv8-A correspond to each other when the vector registers are the same as each other. For example, the "xmm1" vector register of x86_64 and the "v1" vector register of Armv8-A are vector registers that correspond to each other.

Also, when the vector register of Arm v8-A is specified as an operand of the assembly instruction, a format such as "vi.s4", "vi.h8", "vi.b16" (0≤i≤31) is used. In this format, each of "s", "h" and "b" following a dot is a format indicating a size of each element of the vector data stored in one register "vi". For example, the "s" indicates that the size of the element is a single word (32 bits), and the "h" indicates that the size of the element is a half word (16 bits). Then, the "b" indicates that the size of the element is a byte (8 bits).

Figure 3B:
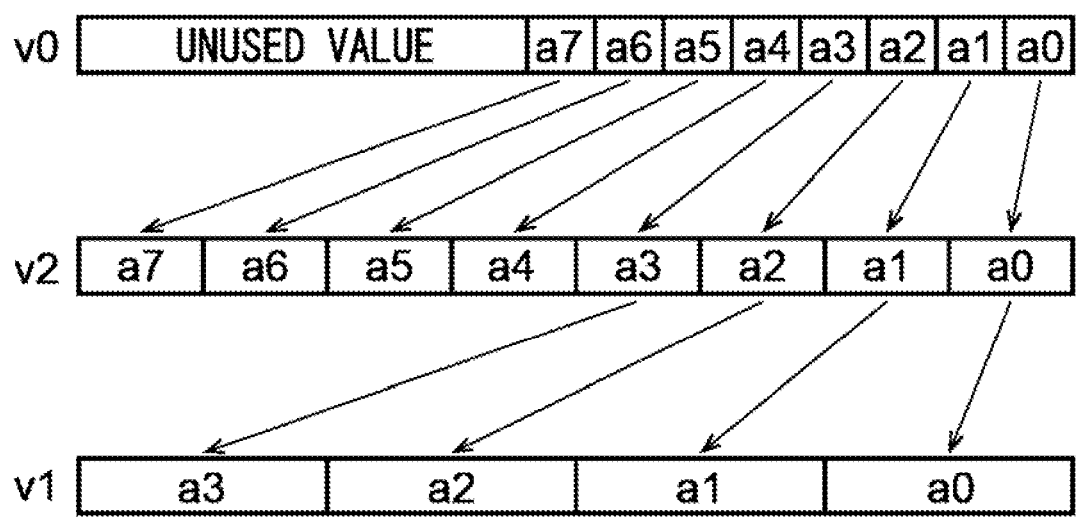
FIG. 3B is a schematic diagram for explaining assembly instructions "sxtl" included in an instruction set of the Armv8-A architecture.

FIG. 3B is a schematic diagram for explaining assembly instructions "sxtl" included in an instruction set of the Armv8-A architecture.

The assembly instruction "sxtl" is an instruction for sign-extending each element of the data stored in the vector register according to the size of the element of the vector register specified in the operand.

For example, it is assumed a case where "vi.h8" (0≤i≤31) is specified for a first operand and "vj.b16" (0≤j≤31) is specified for a second operand, as illustrated in "sxtl v2.h8, v0.b16". In this case, the assembly instruction "sxtl" sign-extends 8-bit data stored in each of the lower eight elements of the vector register "vj" to 16 bits and stores it in each element of the vector register "vi". For example, "sxtl v2.h8, v0.b16" sign-extends 8-bit data a0 to a7 stored in the lower eight elements of the vector register v0 to 16 bits, and stores them in the eight elements of the vector register v2.

Further, it is assumed a ease where "vi.s4" (0≤i≤31) is specified for the first operand and "vj.h8" (0≤j≤31) is specified for the second operand, as illustrated in "sxtl v1.s4, v2.h8" In this case, the assembly instruction "sxtl" sign-extends 16-bit data stored in each of the lower four elements of the vector register "vj" to 32 bits and stores it in each element of the vector register "vi". For example, "sxtl v1.s4, v2.h8" sign-extends 16-bit data a0 to a3 stored in the lower four elements of the vector register v2 to 32 bits, and stores them in the four elements of the vector register v1.

Therefore, when "sxtl v2.h8, v0.b16" and "sxtl v1.s4, v2.h8" are executed in this order as illustrated in FIG. 3B, it is possible to realize processing equivalent to the assembly instruction "vpmovsxbd" of x86_64 which sign-extends each of the lower four data from 8 bits to 32 bits.

Figure 4:
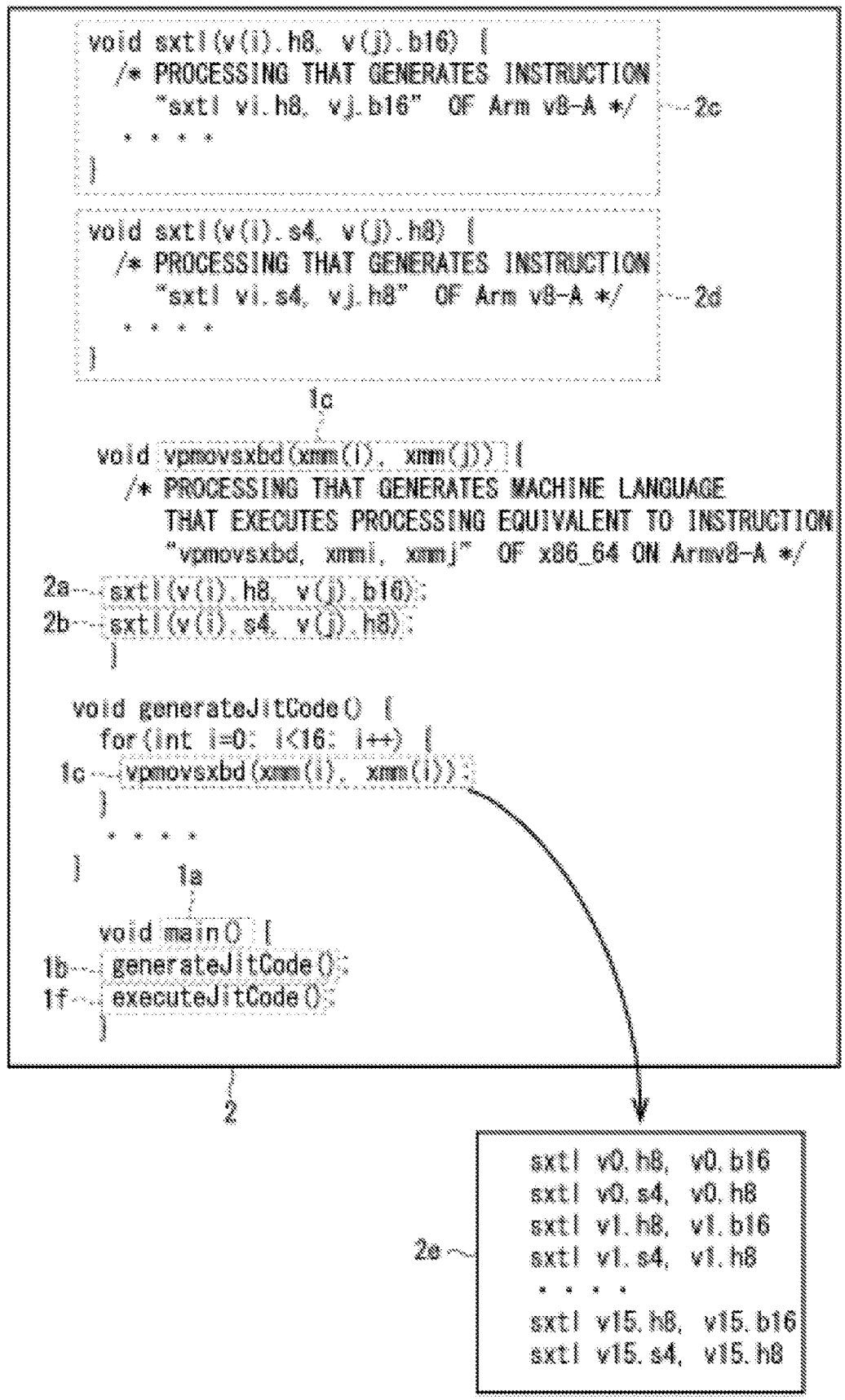
FIG. 4 is a schematic diagram of a modified source code so as to generate the machine languages of the instruction set of the Armv8-A architecture.

FIG. 4 is a schematic diagram of a source code 2 in which the source code 1 is modified so as to generate the machine language of the instruction set of the Armv8-A architecture by utilizing this. In FIG. 4, the same elements as those in FIG. 1 are designated by the same reference numerals, and the description thereof will be omitted below.

In the example of FIG. 4, when the vpmovsxbd function 1c is called, the respective sxtl functions of a code 2a and a code 2b are executed.

The sxtl function is the mnemonic function of the assembly instruction "sxtl". In this example, the processing content of the sxtl function changes depending on a type of the argument of the sxtl function. For example, it is assumed a case where the sxtl function is described as "sxtl (v(i).h8, v(j).b16)". In this case, the sxtl function generates the machine language of the assembly instruction "sxtl vi.h8, vj.b16" of the Arm v8-A architecture, as illustrated by a code 2c. When the sxtl function is described as "sxtl (v(i).s4, v(j).h8)", the sxtl function generates the machine language of the assembly instruction "sxtl vi.s4, vj.h8" of the Armv8-A architecture, as illustrated by a code 2d.

Then, when the generateJitCode function 1b is executed, the machine language sequence of each instruction of "sxtl vi.h8, vi.b16" (0≤i≤15) and "sxtl vi.s4, vi.h8" (0≤i≤15) are generated as illustrated by a code 2c. By executing the machine language sequences "sxtl v0.h8, v0.b16" and "sxtl v0.s4, v0.h8" in this order, the processing equivalent to "vpmovsxpd xmm0, xmm0" of the x86_64 architecture can be realized.

This makes it possible to generate the machine languages of the instruction set of the Armv8-A architecture while utilizing the source code 1 for the x86_64 architecture.

However, this method has the following problem.

Figure 5:
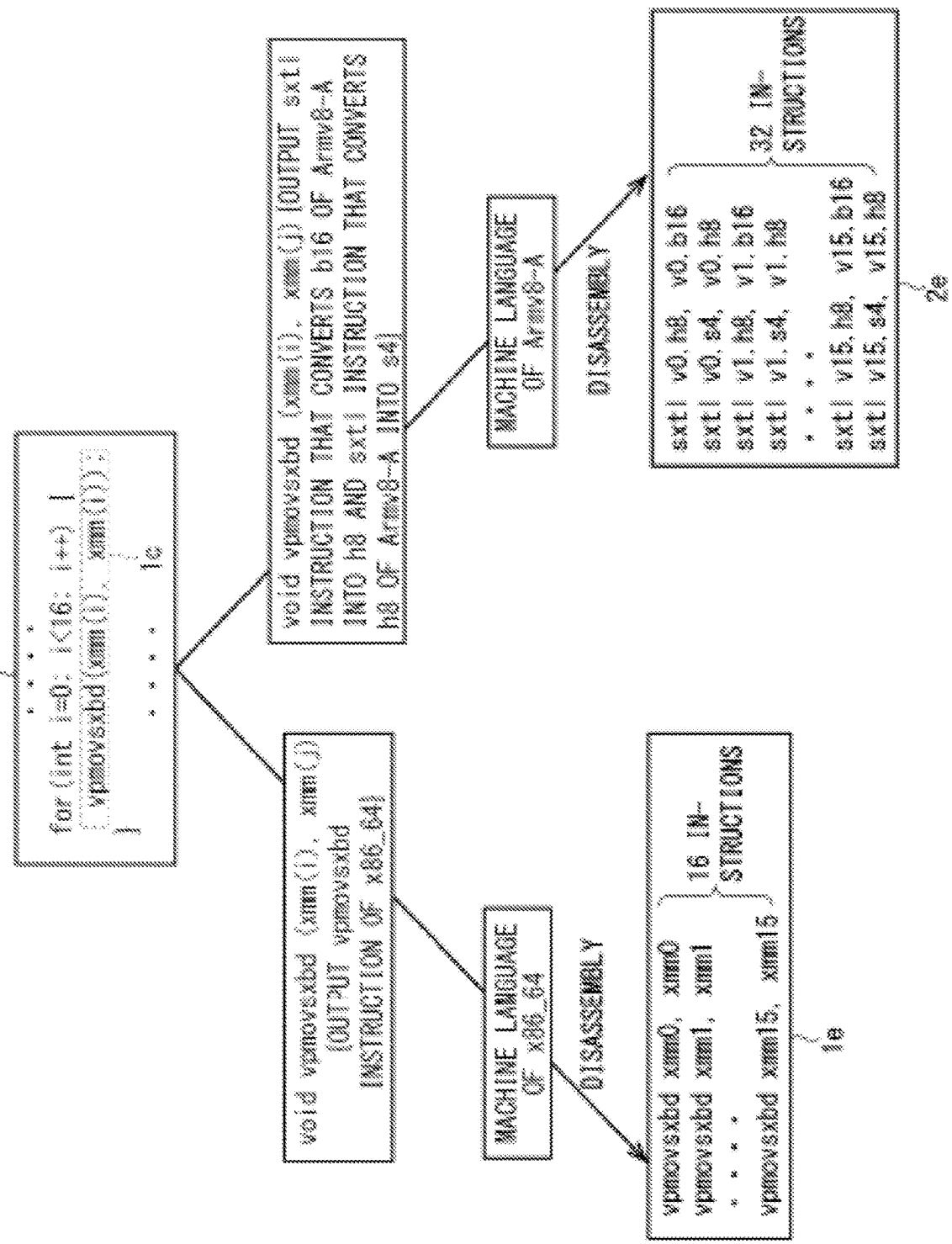
FIG. 5 is a schematic diagram of codes in which machine language sequences are disassembled.

FIG. 5 is a schematic diagram of codes 1e and 2e in which the machine language sequences generated by executing the respective source codes 1 and 2 are disassembled.

As illustrated in FIG. 5, a total of 16 assembly instructions "vpmovsxbd" of x86_64 are generated in response to calling the vpmovsxbd function 16 times inside a for loop of the source code 1.

On the other hand, in Armv8-A, one assembly instruction "vpmovsxbd" is realized by two assembly instructions "sxtl" as described above. Therefore, when the "vpmovsxbd" function is called 16 times inside the for loop of the source code 2, a total of 32 (=2×16) assembly instructions "sxtl" are generated.

Figure 6:
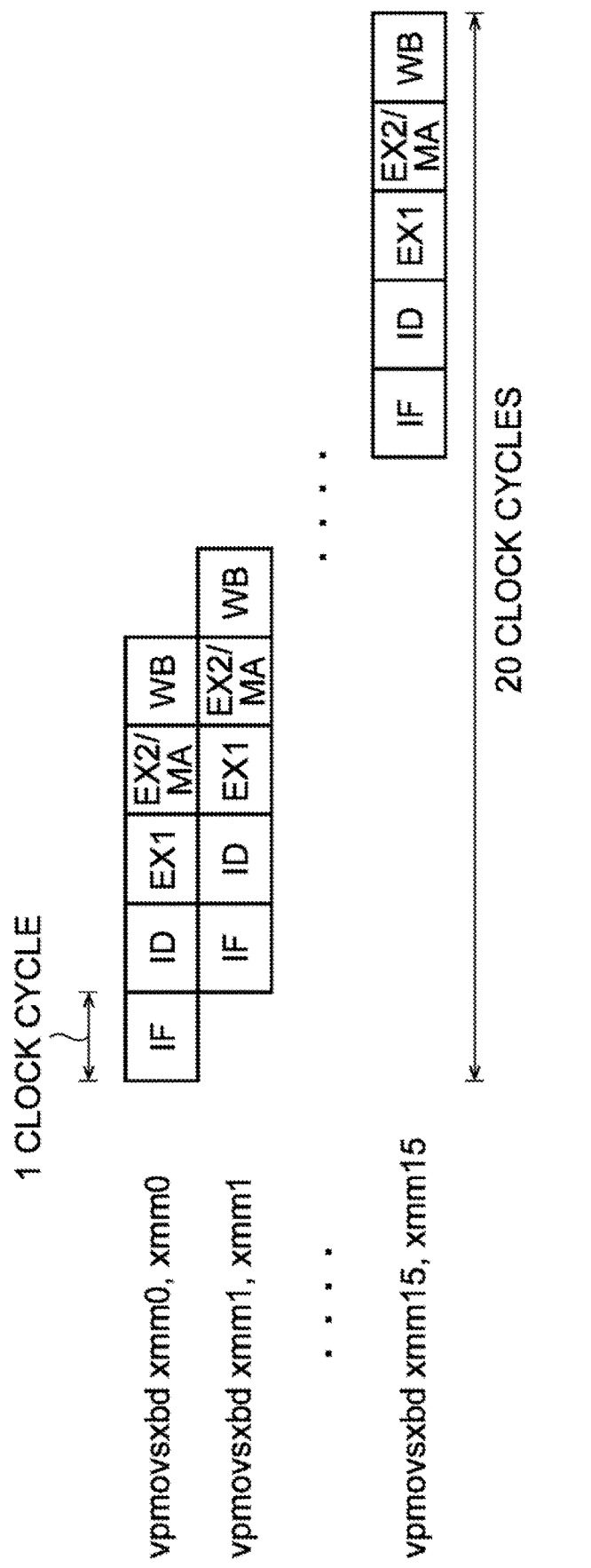
FIG. 6 is a schematic diagram illustrating pipeline processing of 16 assembly instructions of x86_64.

FIG. 6 is a schematic diagram illustrating pipeline processing of the above 16 assembly instructions of x86_64.

The pipeline processing has an IF (instruction fetch) stage, an ID (instruction decode) stage, an EX1 (execution) stage, an EX2/MA (execution/memory access) stage, and a WB (writeback) stage.

The 16 assembly instructions "vpmovsxbd xmmi, xmmi" (0≤i≤15) in the x86_64 architecture use different vector registers, and hence there is no dependency relationship between the instructions. Therefore, each time the IF stage of one assembly instruction is completed, a subsequent assembly instruction can be input to the pipeline. As a result, the execution of 16 assembly instructions is completed in 20 clock cycles.

Figure 7:
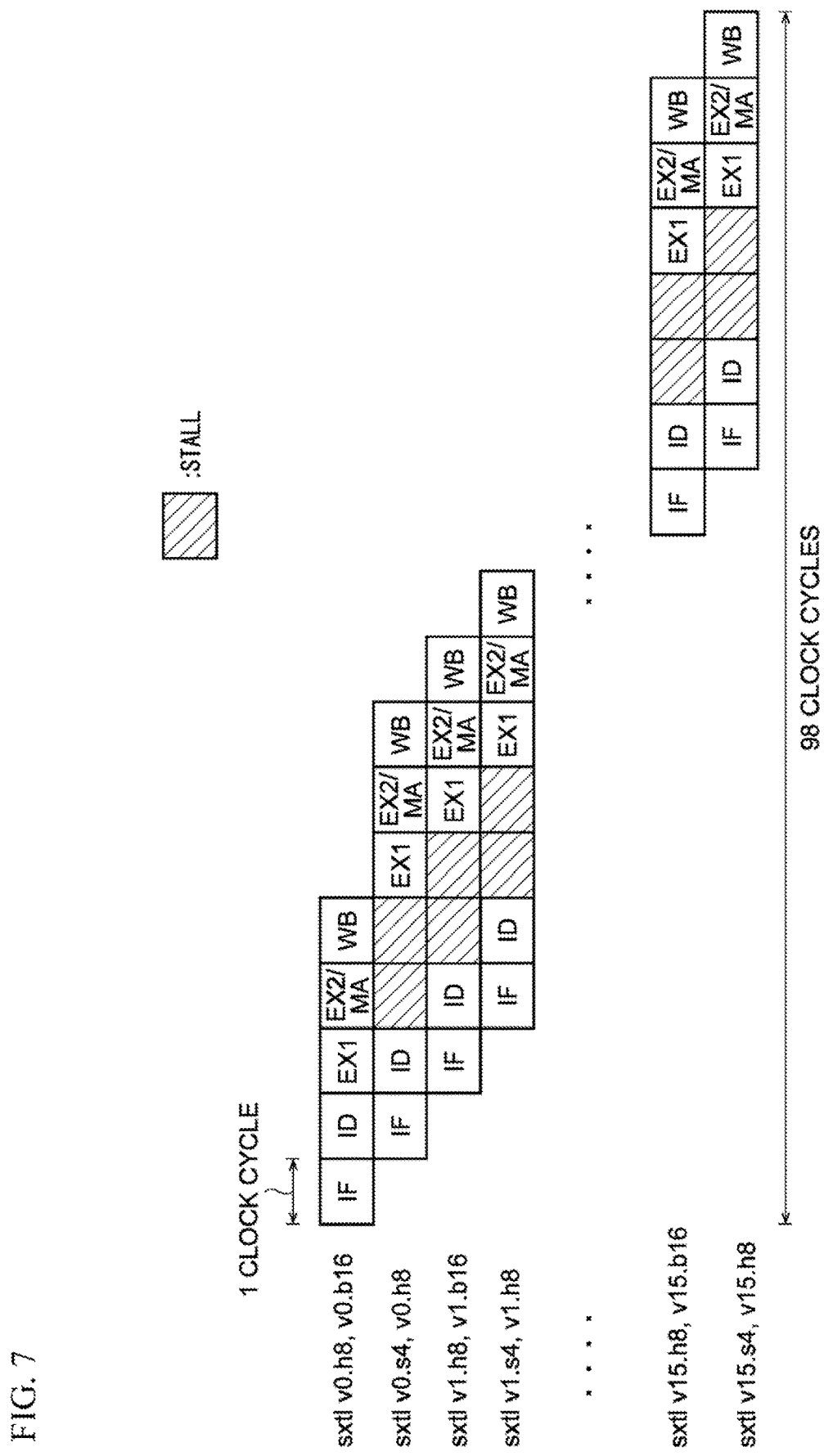
FIG. 7 is a schematic diagram illustrating pipeline processing of 32 assembly instructions of Armv8-A.

FIG. 7 is a schematic diagram illustrating pipeline processing of the above 32 assembly instructions of Armv8-A.

In the pipeline processing, the IF stage, the ID stage, the EX1 stage, the EX2/MA stage, and the WB stage are executed in this order as in the x86_64 architecture.

Now, the second "sxtl v0.s4, v0.h8" instruction is considered. The "sxtl v0.s4, v0.h8" instruction uses the vector register "v0" as a source operand, and this vector register "v0" is also used by a preceding instruction "sxtl v0.h8, v0.b16" as a destination operand. Therefore, the "sxtl v0.s4, v0.h8" instruction cannot execute the EX1 stage until the preceding instruction "sxtl v0.h8, v0.b16" writes data to the vector register "v0" in the WB stage. Therefore, the "sxtl v0.s4, v0.h8" instruction stalls the pipeline for two clock cycles.

Next, the second instruction "sxtl v0.s4, v0.h8" and the third instruction "sxtl v1.h8, v1.b16" are considered. Since the instructions use different vector registers respectively, there is no dependency relationship between the instructions. However, the third instruction "sxtl v1.h8, v1.b16" cannot use an arithmetic unit in the EX1 stage until after the second instruction "sxtl v0.s4, v0.h8" completes the EX1 stage and the arithmetic unit is released. Therefore, the third instruction "sxtl v1.b16" also stalls the pipeline for two clock cycles.

Similarly, the 4th to 32nd instructions also stall the pipeline for 2 clock cycles.

As a result, it takes 98 clock cycles to complete the execution of 32 assembly instructions, which increases significantly compared to the number of clock cycles (20 cycles) in the x86_64 architecture.

Hereinafter, each embodiment capable of suppressing an increase in the number of clock cycles will be described.

First Embodiment

Figure 8:
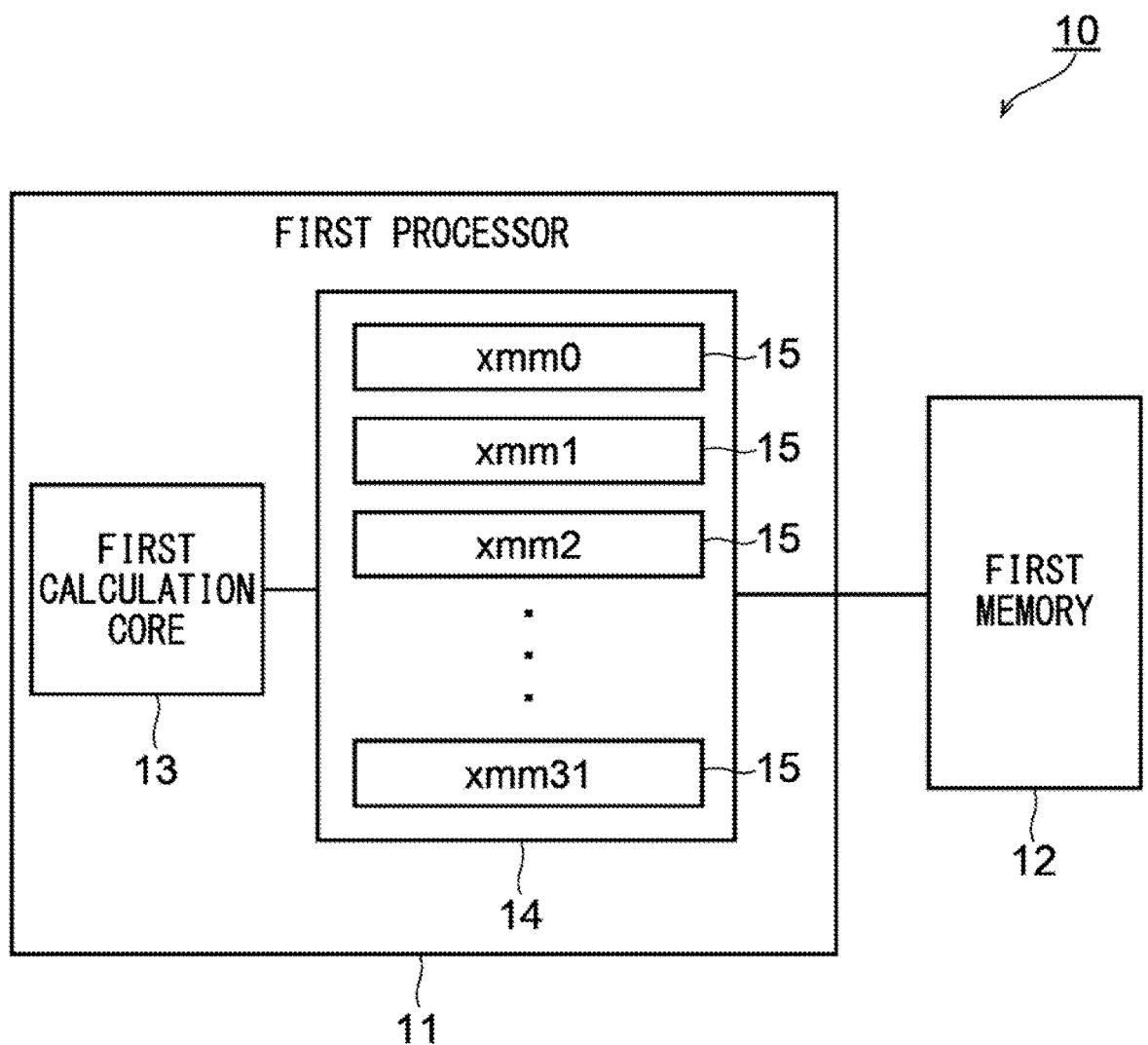
FIG. 8 is a hardware configuration diagram of a first target machine that executes the machine language generated by the JIT compiler technology.

FIG. 8 is a hardware configuration diagram of the first target machine that executes the machine language generated by the JIT compiler technology.

A first target machine 10 is a computer such as a server, a PC (Personal Computer), or a smartphone, and has a first processor 11 and a first memory 12.

The first processor 11 is, for example, a CPU (Central Processing Unit) adopting the x86_64 architecture, and includes a first calculation core 13 including the arithmetic unit that performs arithmetic operations and logical operations, and a first register file 14.

The first register file 14 is hardware having 32 first vector registers 15 identified by the character sequences "xmm0", "xmm1", . . . "xmm31".

On the other hand, the first memory 12 is a volatile memory such as DRAM (Dynamic Random Access Memory) in which the machine language of x86_64 is expanded.

The present embodiment makes it possible to generate the machine language of the instruction set of the second processor as described below from the source code written for the first processor 11 which generate the machine language for the first processor 11 by compiler technology.

Figure 9:
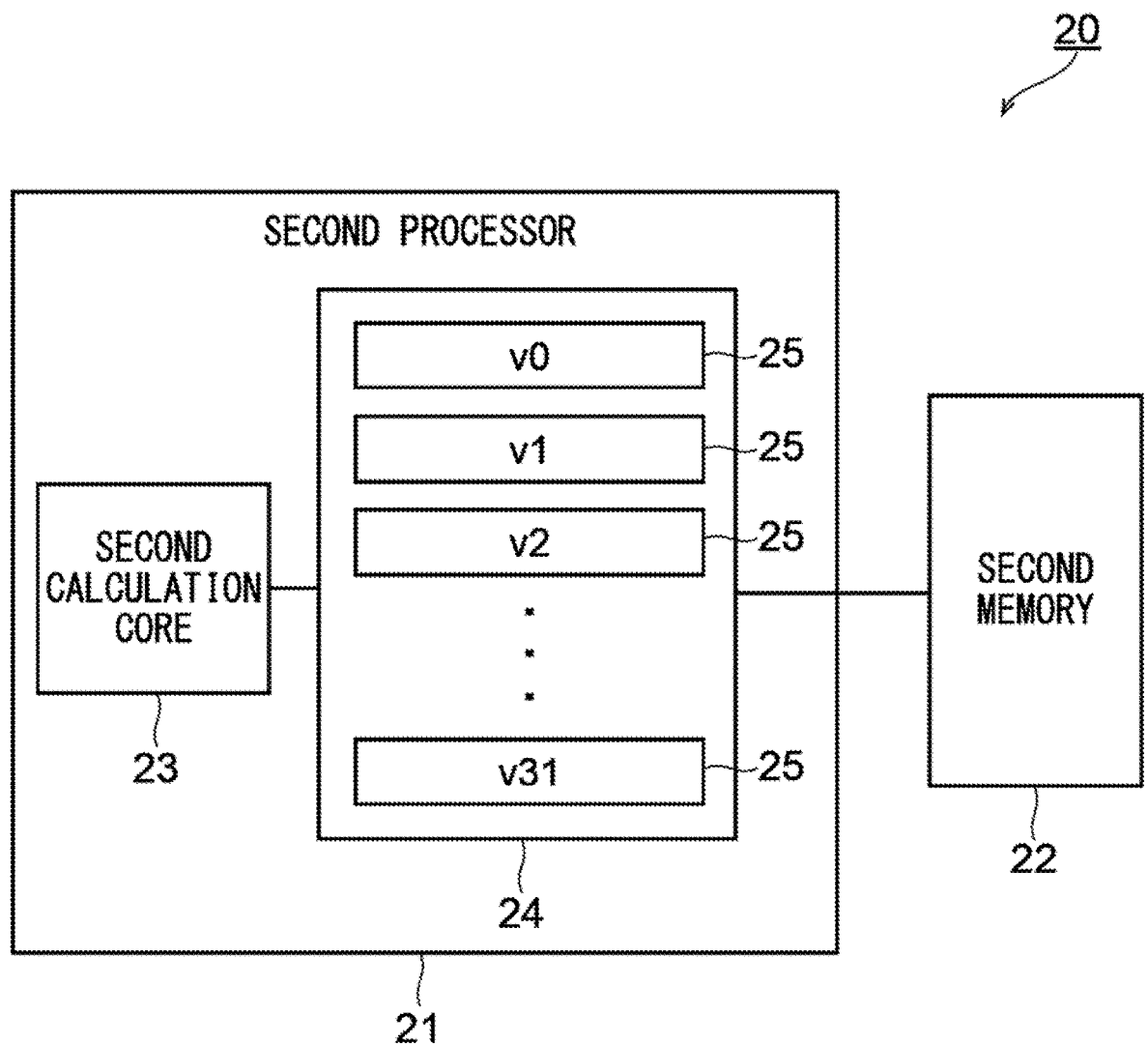
FIG. 9 is a hardware configuration diagram of a second target machine.

FIG. 9 is a hardware configuration diagram of the second target machine.

Similar to the first target machine 10, a second target machine 20 is a computer such as the server, the PC, or the smartphone, and has a second processor 21 and a second memory 22.

The second processor 21 is a CPU that adopts the Armv8-A architecture different from the first processor 11. Further, the second processor 21 includes a second calculation core 23 having an arithmetic unit that performs arithmetic operations and logical operations, and a second register file 24.

The second register file 24 is hardware having 32 second vector registers 25 identified by the character sequences "v0", "v1", . . . "v31".

On the other hand, the second memory 22 is a volatile memory such as DRAM in which the machine language of Armv8-A is developed.

Figure 10:
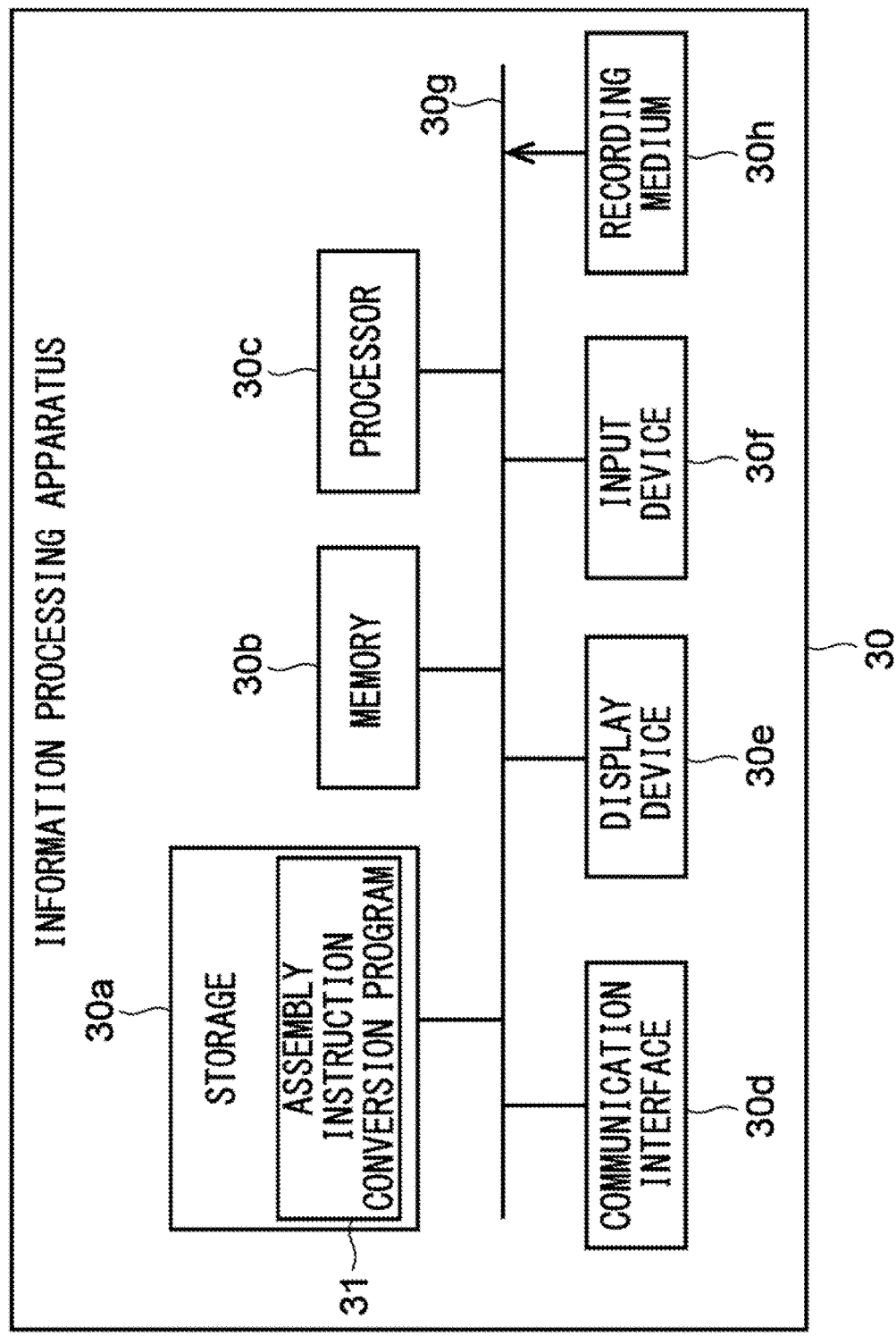
FIG. 10 is a hardware configuration diagram of an information processing apparatus according to a first embodiment and a second embodiment.

FIG. 10 is a hardware configuration diagram of the information processing apparatus for generating the machine language executed by the second processor 21.

As illustrated in FIG. 10, an information processing apparatus 30 includes storage 30a, a memory 30b, a processor 30c, a communication interface 30d, a display device 30e, and an input device 30f. These elements are connected to each other by a bus 30g.

The storage 30a is a non-volatile storage device such as an HDD (Hard Disk Drive) or an SSD (Solid State Drive), and stores an assembly instruction conversion program 31 according to the present embodiment.

The assembly instruction conversion program 31 may be recorded on a compute readable recording medium 30h, and the processor 30c may read the assembly instruction conversion program 31 from the recording medium 30h.

Examples of such a recording medium 30h include physically portable recording media such as a CD-ROM (Compact Disc-Read Only Memory), a DVD (Digital Versatile Disc), and a USB (Universal Serial Bus) memory. Further, a semiconductor memory such as a flash memory, or a hard disk drive may be used as the recording medium 30h. The recording medium 30h is not a temporary medium such as a carrier wave having no physical form.

Further, the assembly instruction conversion program 31 may be stored in a device connected to a public line, the Internet, a LAN (Local Area Network), or the like. In this case, the processor 30c may read and execute the assembly instruction conversion program 31.

Meanwhile, the memory 30b is hardware that temporarily stores data, such as a DRAM (Dynamic Random Access Memory), and the assembly instruction conversion program 31 is deployed on the memory 30b.

The processor 30c is hardware such as a CPU (Central Processing Unit) or a GPU (Graphical Processing Unit) that controls each element of the information processing apparatus 30 and executes the assembly instruction conversion program 31 in cooperation with the memory 30b.

Further, the communication interface 30d is an interface far connecting the information processing apparatus 30 to a network such as a LAN (Local Area Network).

The display device 30e is hardware such as a liquid crystal display device, and displays a prompt prompting the developer to input various information. Further, the input device 30f is hardware such as a keyboard and a mouse.

Next, an example of the source code of the assembly instruction conversion program 31 will be described.

FIG. 11 is a schematic diagram of a pseudo source code 32 described by C++ of the assembly instruction conversion program.

In the source code 32, a generateJitCode function 34, a genJitCodeOfFifo function 35, and an executeJitCode function 36 are called in this order by executing a main function 33.

The generateJitCode function 34 is a function that calls a vpmovsxbd function 38 a plurality of times inside a for loop 37. When the execution of the for loop 37 is completed, the generateJitCode function 34 calls a ret function 51.

FIG. 12 is a schematic diagram of a pseudo source code described by C++ illustrating an example of the definition of the vpmovsxbd function 38.

In this example, an XmmReg type, a VRegB16 type, a VRegH8 type, and a VRegS4 type are defined in a code 43. The XmmReg type is a type having a member variable "index" representing a register number of each of 32 first vector registers 15 (see FIG. 8) of x86_64.

On the other hand, each of the VRegB16 type, the VRegH8 type and the VRegS4 type is a type having a member variable "index" representing a register number of each of 32 second vector registers 25 (see FIG. 9) of Armv8-A. The VRegB16 type is a type that specifies the second vector register 25 having 16 byte-sized (8-bit) elements. Further, the VRegH8 type is a type that specifies the second vector register 25 having eight halfword-sized (16 bits) elements. Then, the VRegS4 type is a type that specifies the second vector register 25 having four single-word-sized it) elements.

The vpmovsxbd function 38 is a function that takes the above-mentioned XmmReg type variable as an argument, and is a mnemonic function that generates the machine language of Armv8-A that executes processing equivalent to the assembly instruction "vpmovsxbd" of x86_64.

An argument "XmmReg src" of the vpmovsxbd function 38 is a variable indicating the first operand of the XmmReg type, and an argument "XmmReg dst" is a variable indicating the second operand of the XmmReg type. In this case, the vpmovsxbd function 38 generates the machine language of Armv8-A that executes processing equivalent the assembly instruction "vpmovsxbd dst, src" of the x86_64 architecture.

When the vpmovsxbd function 38 is called, either the genJitCodeOfFifo function 35 or a code 40 is executed according to a determination result of an if statement 39.

The code 40 is a code that stores, in a FIFO (First In First Out) buffer, a generation instruction 41 that generates the machine language of Armv8-A that executes processing equivalent to the assembly instruction "vpmovsxbd dst, src".

Figure 13:
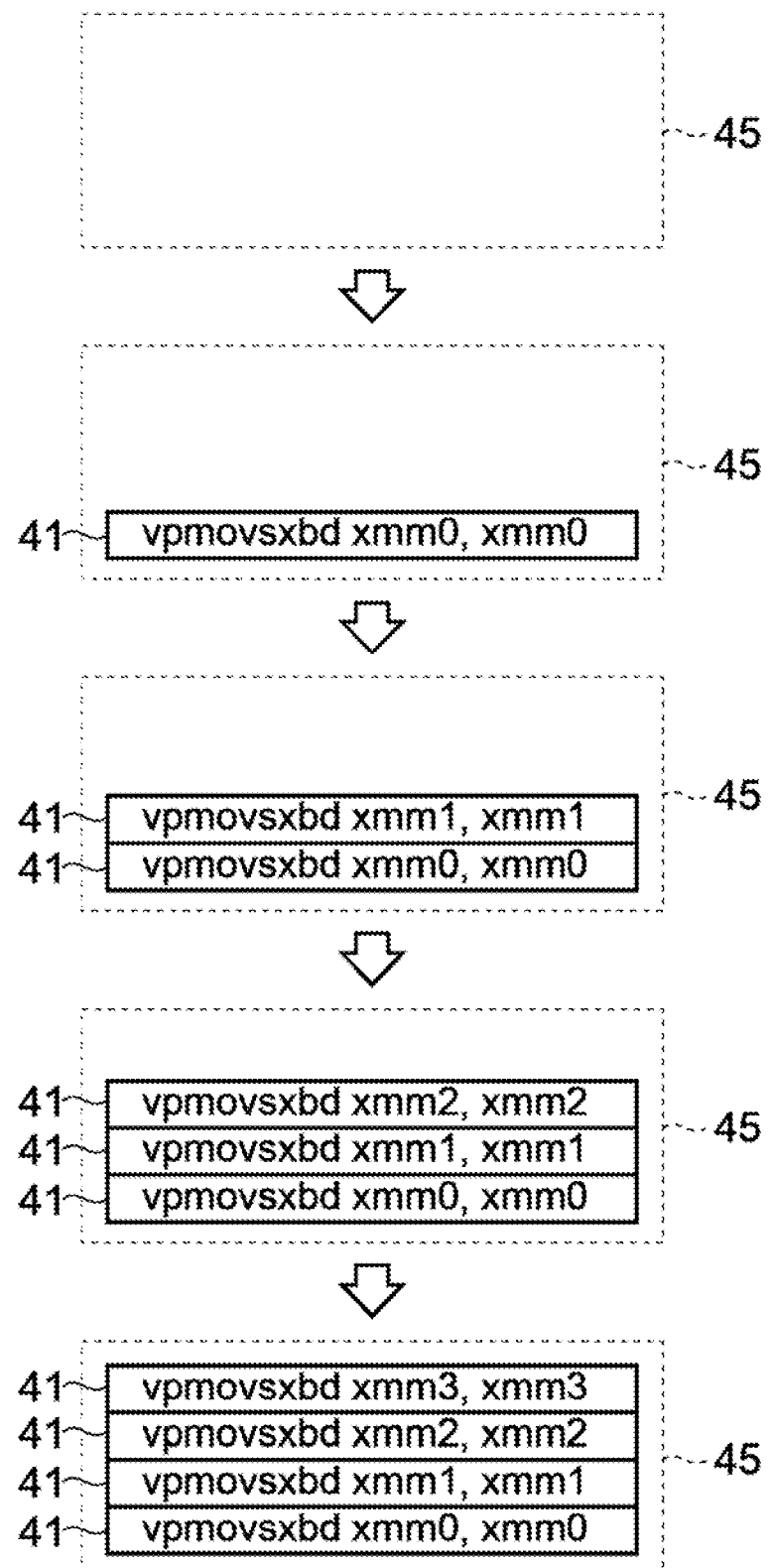
FIG. 13 is a schematic diagram of a FIFO buffer according to the first embodiment.

FIG. 13 is a schematic diagram of the FIFO buffer.

A FIFO buffer 45 is an example of a storage area reserved in the storage 30a, the memory 30b, or the like, and is empty before the source code 32 is executed.

The generation instruction 41 is stored in the FIFO buffer 45 each time the code 40 is executed. Here, each of a plurality of generation instructions 41 is identified by an assembly instruction such as "vpmovsxbd, xmm0, xmm0". For example, the generation instruction 41 identified by "vpmovsxbd, xmm0, xmm0" represents an instruction to generate the machine language of Armv8-A that executes processing equivalent to the assembly instruction "vpmovsxbd, xmm0, xmm0" of x86_64.

An order in which the generation instructions 41 are stored in the FIFO buffer 45 is the same as an order in which the codes 40 are executed.

For example, in the example of FIG. 11, the vpmovsxbd function 38 is called four times while changing the value of the variable "i" indicating the register number inside the for loop 37. Therefore, when the for loop 37 is executed first, the generation instruction 41 of "vpmovsxbd xmm0, xmm0" corresponding to "i=0" is first stored in the FIFO buffer 45. After that, the generation instruction 41 of "vpmovsxbd xmm1, xmm1" corresponding to "i=1" is stored in the FIFO buffer 45, and the generation instruction 41 of "vpmovsxbd xmm3, xmm3" is finally stored in the FIFO buffer 45.

FIG. 12 is referred again.

The if statement 39 is a statement for determining whether a type of the assembly instruction indicated by the generation instruction 41 stored in the FIFO buffer 45 is different from a type of a mnemonic function vpmovsxbd. Here, the type of the assembly instruction is a set of a name of the as instruction and a type of its operand. And, the type of the mnemonic function is a set of a name of the mnemonic function and a type of the argument.

For example, assume that the assembly instruction indicated by the generation instruction 41 stored in the FIFO buffer 45 is "vpmovsxbd dst, src". In this case, the name of the assembly instruction indicated by the generation instruction 41 matches the name "vpmovsxbd" of the mnemonic function vpmovsxbd. Each of the types of the first and second operands of the mnemonic function vpmovsxbd is the XmmReg type. This type matches the types of the first and second operands of the assembly instruction "vpmovsxbd dst, src". Therefore, in this case, the type of the assembly instruction "vpmovsxbd dst, src" is the same as the type of the mnemonic function vpmovsxbd.

Then, either the above-mentioned genJitCodeOfFifo function 35 or the code 40 is executed according to the determination result of the if statement 39.

In the present embodiment, when the plurality of generation instructions 41 are stored in the FIFO buffer 45, the types of the assembly instructions indicated by all the stored generation instructions 41 are the same as each other. Therefore, the if statement 39 determines whether the type of the assembly instruction in any one of the plurality of generation instructions 41 is different from the type of the mnemonic function vpmovsxbd.

Figures 14A, 14B:
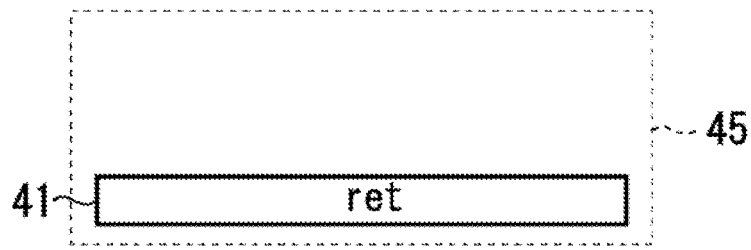
FIG. 14A is schematic diagram of a pseudo source code described by C++ illustrating an example of the definition of a ret function according to the first embodiment.
FIG. 14B is a schematic diagram of the FIFO buffer according to the first embodiment in which a generation instruction of the assembly instruction stored.

FIG. 14A is schematic diagram of a pseudo source code described by C++ illustrating an example of the definition of the ret function 51.

The ret function 51 is the mnemonic function that generates the machine language of Armv8-A that executes processing equivalent to the assembly instruction "ret" included in the instruction set of the x86_64 architecture.

When the ret function 51 is called, either the genJitCodeOfFifo function 35 or a code 53 is executed according to the determination result of an if statement 52.

The if statement 52 is a statement for determining whether the type of the assembly instruction indicated by the generation instruction 41 stored in the FIFO buffer 45 is different from the type of the mnemonic function ret.

The code 53 is the code that stores the generation instructions 41 for the assembly instruction "ret" in the FIFO buffer 45. The generation instruction 41 is an instruction to generate the machine language of Armv8-A that executes processing equivalent to the assembly instruction "ret" of x86_64.

FIG. 14B is a schematic diagram of the FIFO buffer in which the generation instruction 41 of the assembly instruction "ret" is stored.

As described above, in the present embodiment, only the generation instruction 41 corresponding to the same type of assembly instruction is stored in the FIFO buffer 45. Therefore, the generation instruction 41 corresponding to the assembly instruction "ret" and the generation instruction 41 corresponding to the assembly instruction "vpmovsxbd" do not coexist in the FIFO buffer 45.

FIG. 15 is a schematic diagram of the pseudo source code described by C++ illustrating an example of the definition of the genJitCodeOfFifo function 35.

As illustrated in FIG. 15, the genJitCodeOfFifo function 35 determines the content of a variable instType in the if statement 54 and executes processing according to the content. The variable instType is a variable indicating the name of the assembly instruction indicated by the generation instruction 41 in the FIFO buffer 45 and the type of its operand.

For example, in the case of the generation instruction 41 of "vpmovsxbd xmm0, xmm0", a name "vpmovsxbd" of the assembly instruction and "XmmReg" which is the type of each of the first operand (xmm0) and the second operand (xmm0) are stored in the variable instType.

When the generation instruction 41 of the assembly instruction "vpmovsxbd" is stored in the FIFO buffer 45, an evaluation formula of the if statement 54 becomes true, and a translateVPMOVSXBD function 56 is called.

When the generation instruction 41 of the assembly instruction "ret" is stored in the FIFO buffer 45, an evaluation formula of the if statement 55 becomes true, and a translateRET function 57 is called.

Then, when the execution of the above translateVPMOVSXBD function 56 and the translateRET function 57 is completed, the genJitCodeOfFifo function 35 empties the contents of the FIFO buffer 45 in the code 58.

FIG. 16 is a schematic diagram of a pseudo source code described by C++ illustrating an example of the definition of the translateVPMOVSXBD function 56.

In this example, the translateVPMOVSXBD function 56 has a first for loop 61 and a second for loop 62. The first for loop 61 is a loop processing that calls a sxtl function 65, which is the mnemonic function of the assembly instruction "sxtl", in order from the beginning of the generation instructions 41 stored in the FIFO buffer 45. The number of times the sxtl function 65 is called inside the translateVPMOVSXBD function 56 is equal to the number of generation instructions 41 corresponding to the assembly instruction "vpmovsxbd" stored in the FIFO buffer 45.

Here, in a code 63, a variable "vB16" of the VRegB16 type and a variable "vH8" of the VRegH8 type are declared. Then, in a code 64, the register number of the second operand of the assembly instruction corresponding to the i-th generation instruction 41 from the beginning of the FIFO buffer 45 is stored in the member variable "index" of the variable "vB16". Similarly, in the code 64, the register number of the first operand of the assembly instruction corresponding to the i-th generation instruction 41 from the beginning of the FIFO buffer 45 is stored in the member variable "index" of the variable "vH8".

After that, the sxtl function 65 generates the machine language of the assembly instruction "sxtl" included in the instruction set of Armv8-A, The first operand of the assembly instruction "sxtl" is the second vector register 25 having the register number indicated by the vH8.index among the 32 second vector registers 25. The second operand of the assembly instruction "sxtl" is the second vector register 25 having the register number indicated by vB16.index among the 32 second vector registers 25.

In this case, the assembly instruction "sxtl" is an instruction to sign-extend the 8-bit element of the second vector register 25 indicated by the second operand to 16 bits, and store it in each element of the second vector register 25 indicated by the first operand.

The processing inside the first for loop 61 is executed in an ascending order of the variable "i" indicating the order of the generation instruction 41 stored in the FIFO buffer 45. Therefore, the machine language is generated by the sxt1 function 65 in order from the generation instruction 41 first stored in the FIFO buffer 45.

Similarly, the second for loop 62 is a loop processing that calls a sxt1 function 68, which is the mnemonic function of the assembly instruction "sxt1" in order from the beginning of the generation instructions 41 stored in the FIFO buffer 45. The number of times the sxt1 function 68 is called inside the translateVPMOVSXBD function 56 is equal to the number of generation instructions 41 corresponding to the assembly instruction "vpmovsxbd" stored in the FIFO buffer 45.

In this example, in a code 66, the variable "vH8" of the VRegH8 type and a variable "vS4" of the VRegS4 type are declared. Then, in a code 67, the register number of the second operand of the assembly instruction corresponding to the i-th generation instruction 41 from the beginning of the FIFO buffer 45 is stored in the member variable "index" of the variable "vH8". Similarly, the register number of the first operand of the assembly instruction corresponding to the i-th generation instruction 41 from the beginning of the FIFO buffer 45 is stored in the member variable "index" of the variable "vS4".

After that, the sxt1 function 68 generates the machine language of the assembly instruction "sxt1". The first operand of the assembly instruction "sxt1" is the second vector register 25 having the register number indicated by the vS4.index among the 32 second vector registers 25. Similarly, the second operand of the assembly instruction "sxt1" is the second vector register 25 having the register number indicated by the vH8.index among the 32 second vector registers 25.

In this case, the assembly instruction "sxt1" is an instruction to sign-extend the 16-bit element of the second vector register 25 indicated by the second operand to 32 bits, and store it in each element of the second vector register 25 indicated by the first operand.

Similar to the first for loop 61, the processing inside the second for loop 62 is executed in the ascending order of the variable "i" indicating the order of the generation instruction 41 stored in the FIFO buffer 45. Therefore, the machine language is generated by the sxt1 function 68 in order from the generation instruction 41 first stored in the FIFO buffer 45.

FIG. 17 is a schematic diagram of a pseudo source code described by C++ illustrating an example of the definition of the translateRET function 57.

The translateRET function 57 performs a processing of calling a ret_Armv8a function 69, which is the mnemonic function of the assembly instruction "ret" of Armv8-A, when the generation instruction 41 corresponding to the assembly instruction "ret" of x86_64 is stored in the FIFO buffer 45. Since the same assembly instruction "ret" exists in the x86_64 architecture, the name of the mnemonic function corresponding to the assembly instruction "ret" of Armv8-A is ret_Armv8a in order to distinguish them. Also, since the assembly instruction "ret" of Armv8-A does not take the operand, the corresponding mnemonic function ret_Armv8a does not take the argument. The number of times the ret_Armv8a function 69 is called inside the translateRET function 57 is equal to the number of generation instructions 41 corresponding to the assembly instruction "ret" stored in the FIFO buffer 45.

Figure 18:
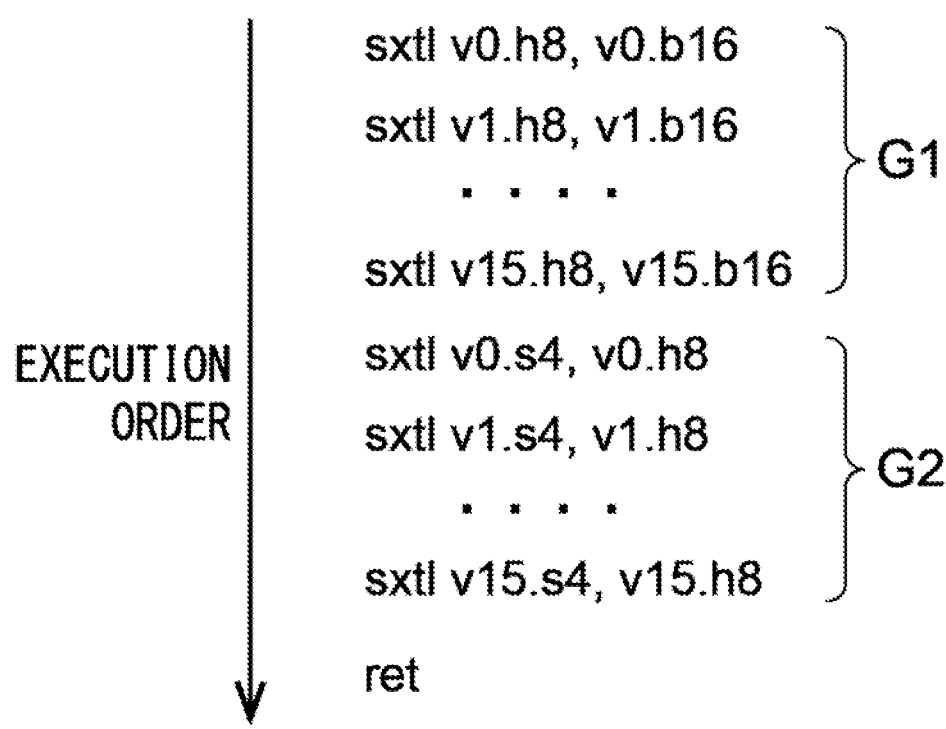
FIG. 18 is a schematic diagram of instruction sequences of the assembly instructions obtained by disassembling the machine language generated when the assembly instruction conversion program according to the first embodiment is executed.

FIG. 18 is a schematic diagram of instruction sequences of the assembly instructions obtained by disassembling the machine language generated when the assembly instruction conversion program 31 is executed. The assembly instructions are instructions which are defined in Armv8-A and are the instruction set of the second processor 21 (see FIG. 9).

In the present embodiment, by executing the first for loop 61 (see FIG. 16), the machine languages corresponding to the instruction sequences "sxt1 v0.h8, v0.b16", "sxt1 v1.h8, v1.b16", . . . "sxt1 v3.h8, v3.b16" of the assembly instructions are generated in this order, as illustrated by a group G1. In these assembly instructions, the second vector registers 25 having mutually different register numbers are specified in the operands, and hence the plurality of assembly instructions having the dependency relationship are not arranged adjacent to each other.

Then, by executing the second for loop 62, the machine languages corresponding to the instruction sequences "sxt1 v0.s4, v0.h8", "sxt1 v1.s4, v1.h8", . . . "sxt1 v3.s4, v3.h8" of the assembly instructions are generated in this order, as illustrated by a group G2. Also in these assembly instructions, the second vector registers 25 having mutually different register minibus are specified in the operands, and hence the plurality of assembly instructions having the dependency relationship are not arranged adjacent to each other.

Thus, in the present embodiment, the respective assembly instructions that are elements of the group G1 use the second vector registers 25 different from each other. The same applies to the group G2. As a result, it is possible to prevent the assembly instructions having the dependency relationship from being arranged adjacent to each other, as described above.

Figure 19:
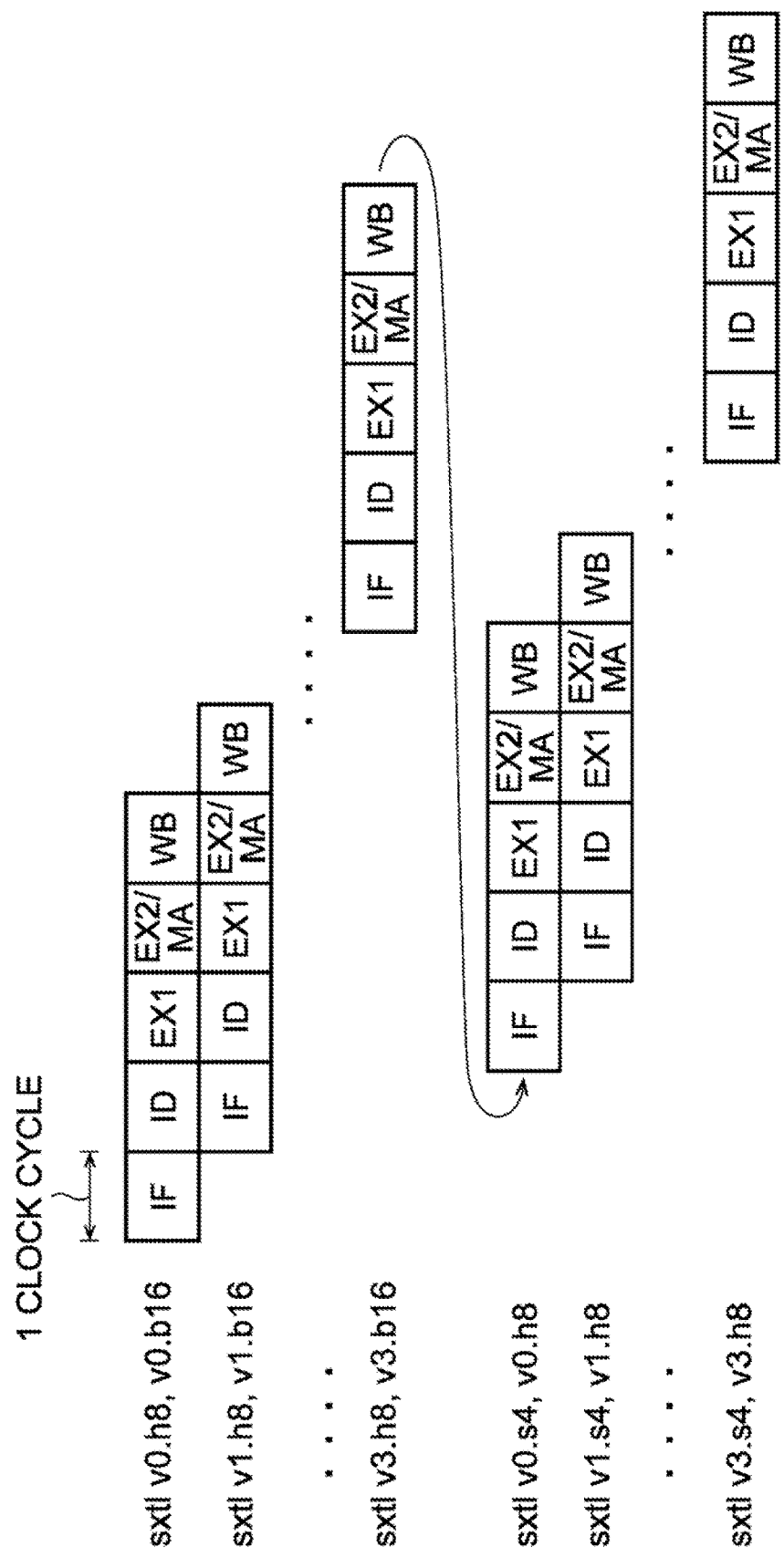
FIG. 19 is a schematic diagram illustrating the pipeline processing, of the respective assembly instructions in FIG. 16 executed by a second processor.

FIG. 19 is a schematic diagram illustrating the pipeline processing of the respective assembly instructions in FIG. 16 executed by the second processor 21.

Since the plurality of assembly instructions having the dependency relationship are not arranged adjacent to each other in the present embodiment, described above, the arrangement is an ideal order of the machine languages that does not cause the stall due to the dependency relationship during the execution of the pipeline processing. As a result, it is possible to prevent the pipeline from stalling at the time of the execution of each machine language as illustrated in FIG. 7, and the processing can be executed with to smaller number of clock cycles than in FIG. 7.

Figure 20:
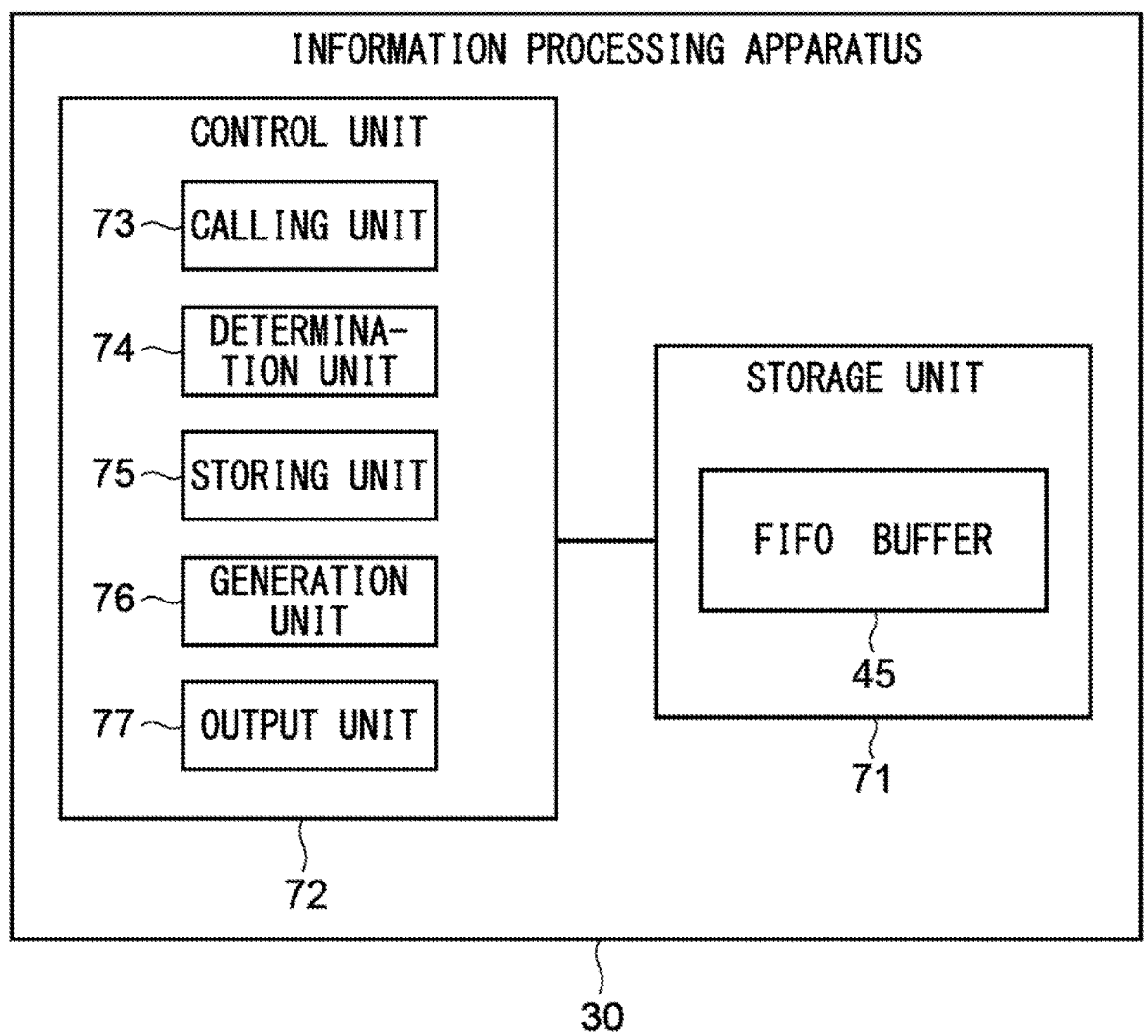
FIG. 20 is a functional configuration diagram of the information processing apparatus according to the first embodiment.

FIG. 20 is a functional configuration diagram of the information processing apparatus 30 according to the present embodiment.

As illustrated in FIG. 20, the information processing apparatus 30 has a storage unit 71 and a control unit 72.

The storage unit 71 is a processing unit that stores the FIFO buffer 45. As an example, the storage unit 71 is realized by the storage 30a and the memory 30b of FIG. 10.

On the other hand, the control unit 72 is a processing unit that controls each unit of the information processing apparatus 30, and includes a calling unit 73, a determination unit 74, a storing unit 75, a generation unit 76, and an output unit 77. Each of these units is realized by executing the assembly instruction conversion program 31 (see FIG. 10) in cooperation with the memory 30b and the processor 30c.

The calling unit 73 is a processing unit that calls the mnemonic function, and is realized by, for example, the generateJitCode function 34 of FIG. 11. When the generateJitCode function 34 is executed as described with reference to FIG. 11, the vpmovsxbd function 38 and the ret function 51 which are the mnemonic functions are called.

The determination unit 74 is a processing unit that determines whether the type of the assembly instruction indicated by the generation instruction 41 stored in the FIFO buffer 45 is different from the type of the mnemonic function called by the calling unit 73. As an example, the determination unit 74 is realized by the if statement 39 of FIG. 12 and the if statement 52 of FIG. 14A.

The storing unit 75 is a processing unit that stores the generation instruction 41 in the FIFO buffer 45, and is realized by the code 40 (sec FIG. 12) and the code 53 (see FIG. 14). When the code 40 is executed for example, the generation instruction 41 is stored in the FIFO buffer 45 for each of the plurality of assembly instructions "vpmovsxbd" in response to each of the plurality of callings to the mnemonic function vpmovsxbd 38 in the for loop 37 (sec FIG. 11).

The generation unit 76 is a processing unit that generates the machine languages of the assembly instructions of Armv8-A that executes processing equivalent to the assembly instructions "vpmovsxbd" corresponding to the generation instructions 41 according to the plurality of generation instructions 41 in the FIFO buffer 45. In this example, the generation unit 76 is realized by the translateVPMOVSXBD function 56 of FIG. 16. The translateVPMOVSXBD function 56 generates the machine languages so that the plurality of assembly instructions "sxt1" having the dependency relationship are not arranged adjacent to each other, as illustrated in FIG. 18.

The output unit 77 is a processing unit that outputs the machine languages generated by the generation unit 76 to the outside.

Figure 21:
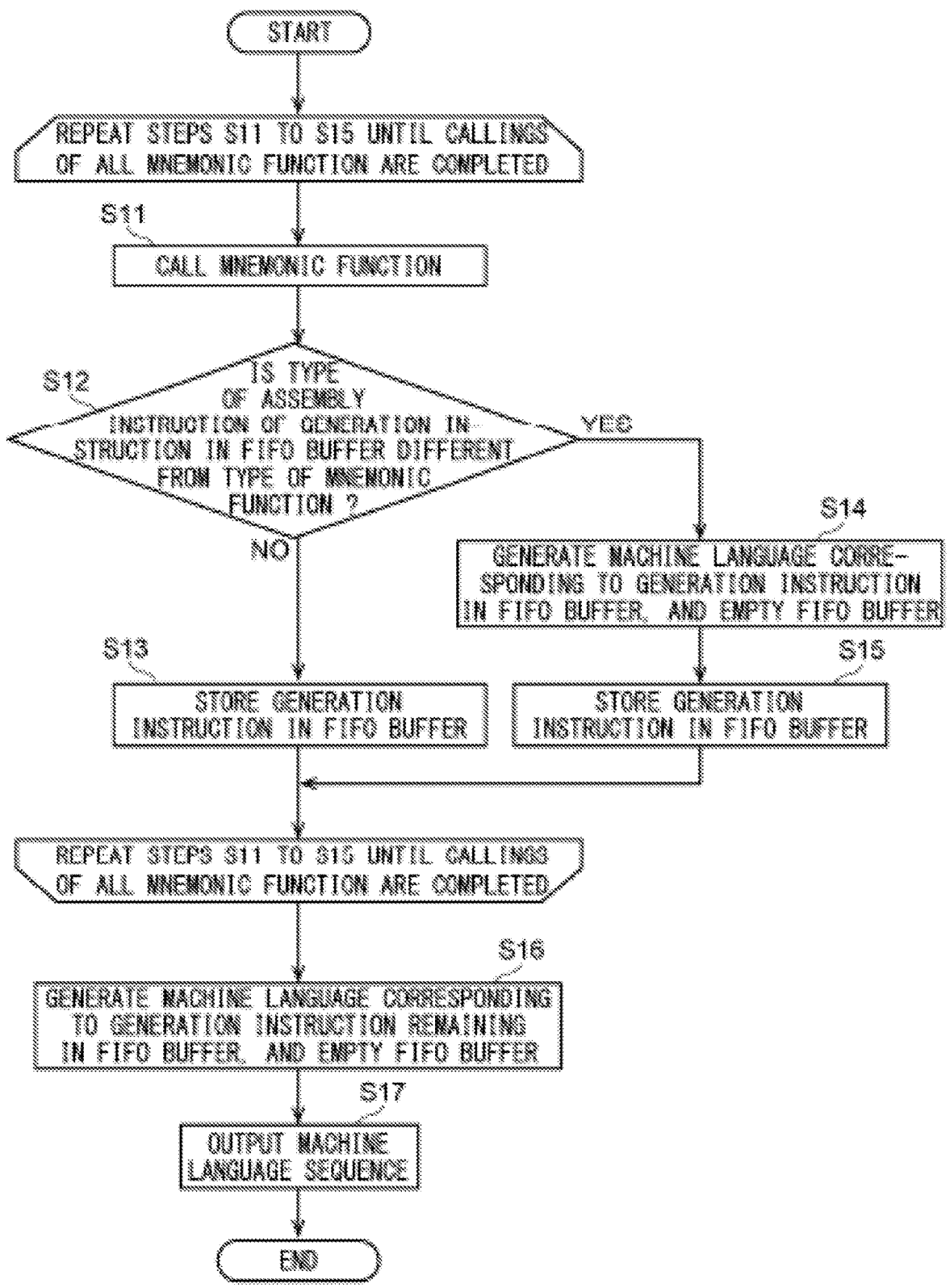
FIG. 21 is a flowchart of the assembly instruction conversion method according to the first embodiment.

FIG. 21 is a flowchart of the assembly instruction conversion method according to the present embodiment.

First, the calling unit 73 calls the mnemonic function (step S11). As an example, the information processing apparatus 30 executes the generateJitCode function 34 of FIG. 11 to call the vpmovsxbd function and the ret function which are the mnemonic functions.

Next, the determination unit 74 determines whether the type of each of the assembly instructions indicated by the generation instructions 41 in the FIFO buffer 45 is different from the type of each of the mnemonic functions called in step S11 (step S12). At this time, the determination unit 74 also determines whether the FIFO buffer 45 is empty.

Here, when the FIFO buffer 45 is empty, or when the type of each of the assembly instructions indicated by the generation instructions 41 and the type of each of the mnemonic functions are the same as each other, the process proceeds to step S13.

In step S13, the storing unit 75 stores the generation instructions 41 in the FIFO buffer 45. When the vpmovsxbd function 35 which is the mnemonic function is called in step S11, the generation instruction 41 is the instruction to generate the machine language of the assembly instruction of Armv8-A that executes processing equivalent to the assembly instruction "vpmovsxbd". Further, when the ret function 51 which is the mnemonic function is called in step S11, the generation instruction 41 is the instruction to generate the machine language of the assembly instruction of Armv8-A that executes processing equivalent to the assembly instruction "ref".

On the other hand, when the type of each of the assembly instructions indicated by the generation instructions 41 and the type of each of the mnemonic functions are different from each other (step S12: YES), the process proceeds to step S14. In a case where the assembly instruction indicated by the generation instruction 41 stored in the FIFO buffer 45 is "vpmovsxbd" as an example, the process proceeds to step S14 when the mnemonic function ret is called in step S11.

In step S14, the generation unit 76 generates the machine language of the assembly instruction of Armv8-A that executes processing equivalent to the assembly instruction "vpmovsxbd" corresponding to the generation instruction 41 for each of the plurality of generation instructions 41 in the FIFO buffer 45.

In the present embodiment, the machine language of the assembly instruction of Armv8-A is generated by executing the translateVPMOVSXBD function 56 of FIG. 16.

Thereby, the machine languages of the instruction sequences "sxt1 v0.h8, v0.b16", "sxt1 v1.h8, v1.b16", . . . "sxt1 v3.h8, v3.b16" are first generated, and then the machine languages of the instruction sequences "sxt1 v0.s4, v0.h8", "sxt1 v1.s4, v1.h8", . . . "sxt1 v3.s4, v3.h8" are generated, as described above, in these instruction sequences, the plurality of assembly instructions having the dependency relationship are not arranged adjacent to each other.

Moreover, each of the for loops 61 and 62 in the translateVPMOVSXBD function 56 of FIG. 16 generates the machine language of the assembly instruction "sxt1" in the ascending order of the value of the variable "i". Since the variable "i" indicates the order in which the generation instruction 41 is stored in the FIFO buffer 45, the machine language is generated in order from the generation instruction 41 stored first in the FIFO buffer 45. Therefore, the machine language of the assembly instruction "sxt1" can be generated in the same order in which the vpmovsxbd function 38 (see FIG. 11) is called. As a result, even when the vpmovsxbd function 38 is called the plurality of times as illustrated in the source code 32 (see FIG. 11), the machine language having the same execution result as when the assembly instruction "vpmovsxbd" is executed in the same order as above can be generated.

After that, the generation unit 76 empties the FIFO buffer 45.

Next, the storing unit 75 stores the generation instruction 41 in the FIFO buffer 45 (step S15). As an example, it is assumed a case where the assembly instruction indicated by the generation instruction 41 stored in the FIFO buffer 45 before the FIFO buffer 45 is emptied in step S14 is the "vpmovsxbd" instruction and the mnemonic function ret is called in step S11. In this case, the assembly instruction indicated by the generation instruction 41 stored in the FIFO buffer 45 in step S15 is the "ret" instruction.

Then, steps S11 to S15 are repeated until ail the mnemonic functions described in the generateJitCode function 34 are called.

After that, the generation unit 76 generates the machine language corresponding to the generation instruction 41 remaining in the FIFO buffer 45 (step S16). As an example, the information processing apparatus 30 executes the genJitCodeOfFifo function 35 of FIG. 11 to generate the machine language corresponding to the generation instruction 41 remaining in the FIFO buffer 45.

Then, the output unit 77 outputs the machine language sequence generated by the generation unit 76 to the outside (step S17).

This completes the basic processing of the assembly instruction conversion method according to the present embodiment.

According to the above present embodiment, every time the assembly instruction "vpmovsxbd" of x86_64 is acquired, the generation unit 76 does not generate the machine language of the assembly instruction "sxt1" of Armv8-A, but the storing unit 75 temporarily stores each generation instruction 41 in the FIFO buffer 45. Therefore, the generation unit 76 can generate the machine languages of the assembly instructions "sxt1" so that the assembly instructions "sxt1" that uses the same register are not arranged adjacent to each other. As a result, the stall does not occur when the pipeline processing of these machine languages is executed, and it is possible to suppress an increase in the number of clock cycles when the second target machine 20 executes processing equivalent to the assembly instruction "vpmovsxbd" of x86_64.

In particular, the processing equivalent to the assembly instruction "vpmovsxbd" of x86_64 is realized by the two assembly instructions "sxt1" of Armv8-A that use the same second vector register 25. For example, "vpmovsxbd xmm0, xmm1" is realized by "sxt1 v0.h8, v0.b16" and "sxt1 v0.s4, v0.h8" which use the second vector register 25 of "v0". Thus, by applying the present embodiment when the dependency relationship that uses the same second vector register 25 occurs in the assembly instruction of Armv8-A, the dependency relationship can be eliminated and the increase in the number of clock cycles can be suppressed.

When the vpmovsxbd function 38 is called the plurality of times while changing the register number "i" as illustrated in the source code 32 of FIG. 11, the plurality of assembly instructions "sxt1" using the same second vector register 25 are generated as described above. In this case, by applying the present embodiment, the number of clock cycles can be significantly suppressed, and an execution speed of the program can be increased.

Second Embodiment

In the first embodiment, the machine language is generated by using the generation instruction 41 stored in the FIFO buffer 45. In contrast, the second embodiment eliminates the need for the FIFO buffer 45 as follows.

FIG. 22 is a schematic diagram of a pseudo source code 80 described by C++ of the assembly instruction conversion program 31 (see FIG. 10) according to the second embodiment. In FIG. 22, the same elements as those in FIG. 11 are designated by the same reference numerals, and the description thereof will be omitted below.

In the present embodiment, the developer describes an insertDummyStart function 81 and an insertDummyEnd function 82 before and after the for loop 37 of the generateJitCode function 34, as illustrated in FIG. 22. The insertDummyStart function 81 is an example of a first dummy function, and the insertDummyEnd function 82 is an example of a second dummy function.

In this example, the main function 33 calls the generateJitCode function 34, which causes the generateJitCode function 34 to call the vpmovsxbd function 38 and the ret function 51. Then, each of the vpmovsxbd function 38 and the ret function 51 which is the mnemonic function generates the machine language of the Armv8-A architecture.

A reorderJitCode function 83 described inside the main function 33 reorders the machine languages generated by the generateJitCode function 34.

Figure 23:
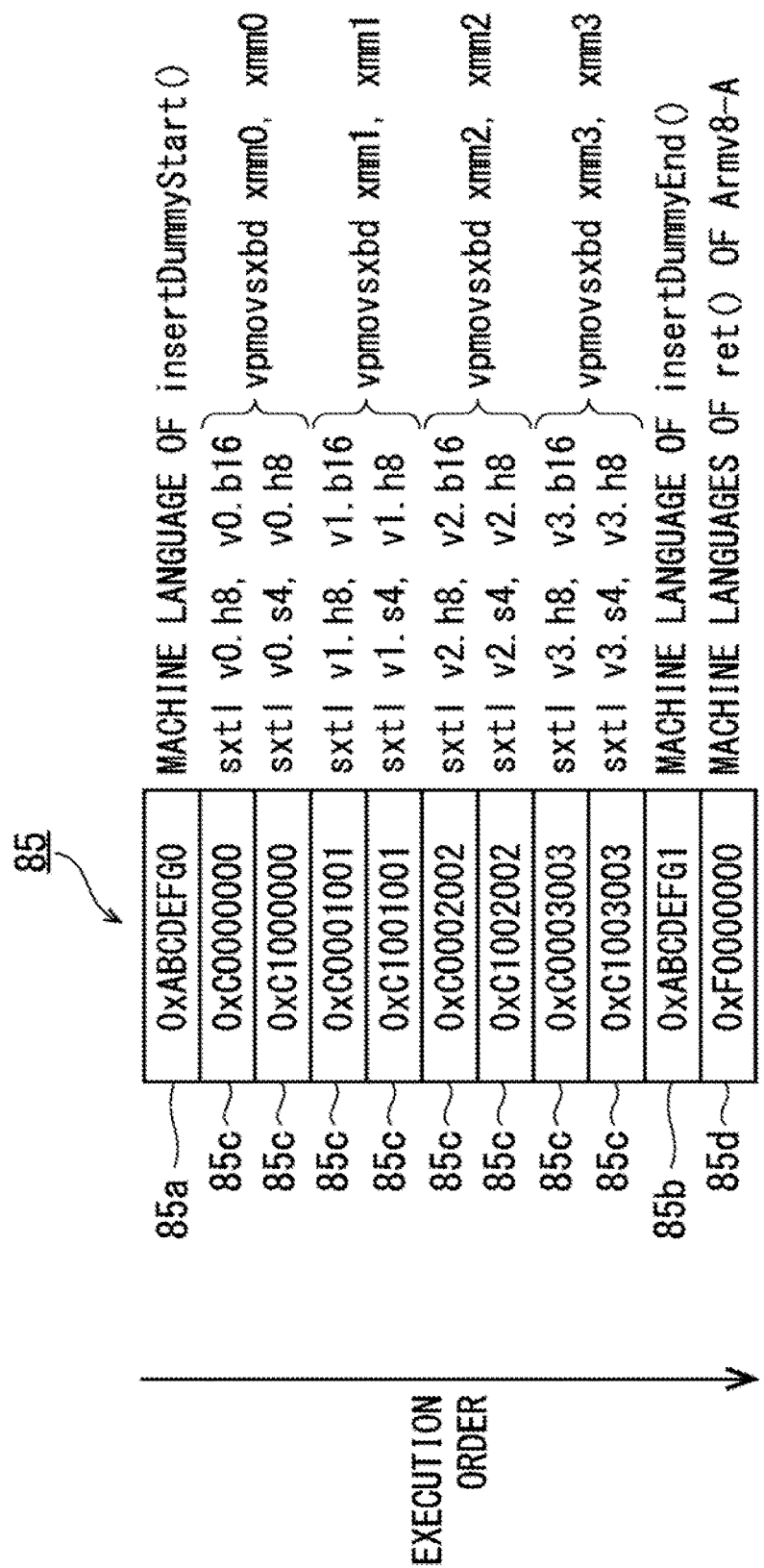
FIG. 23 is a schematic diagram of the machine language sequence generated by the generateJitCode function in the second embodiment.

FIG. 23 is a schematic diagram of machine language sequence 85 generated by the generateJitCode function 34.

As illustrated in FIG. 23, the machine language sequence 85 includes a first dummy machine language 85a that is the machine language of the insertDummyStart function 81, and a second dummy machine language 85b that is the machine language of the insertDummyEnd function 82.

The first dummy machine language 85a and the second dummy machine language 85b are both meaningless machine languages that are not defined in the Armv8-A architecture.

A plurality of machine languages 85c of the plurality of assembly instruction "sxt1" that execute the processing equivalent to the assembly instruction "vpmovsxbd" are generated between the first dummy machine language 85a and the second dummy machine language 85b.

Then, a machine language 85d of the ret function 51 is generated after the second dummy machine language 85b.

At this point, since the adjacent machine language 85c uses the same second vector register 25, the execution of the pipeline processing to the machine language sequence 85 causes the stall as illustrated in FIG. 7.

Therefore, in the present embodiment, the reorderJitCode function 83 reorders the machine languages 85c in the following way.

FIG. 24 is a schematic diagram illustrating a method of reordering the machine languages 85c by the reorderJitCode function 83.

In the example of FIG. 24, the reorderJitCode function 83 assigns numbers "0", "1", "2", . . . to the machine languages 85c in order from the machine language 85c next to the first dummy machine language 85a before reordering. Then, the reorderJitCode function 83 reorders the respective machine languages 85c so that the even-numbered machine languages 85c appear adjacent to each other and then the odd-numbered machine languages 85c appear adjacent to each other. After that, the reorderJitCode function 83 deletes the first dummy machine language 85a and the second dummy machine language 85b.

Thereby, the machine languages 85c of the assembly instruction "str1" that use the same second vector register 25 can be prevented from being arranged adjacent to each other. As a result, the stall does not occur when the pipeline processing of the respective machine languages is executed, and it is possible to suppress the increase in the number of clock cycles when the second target machine 20 executes processing equivalent to the assembly instruction "vpmovsxbd" of x86_64.

Figure 25:
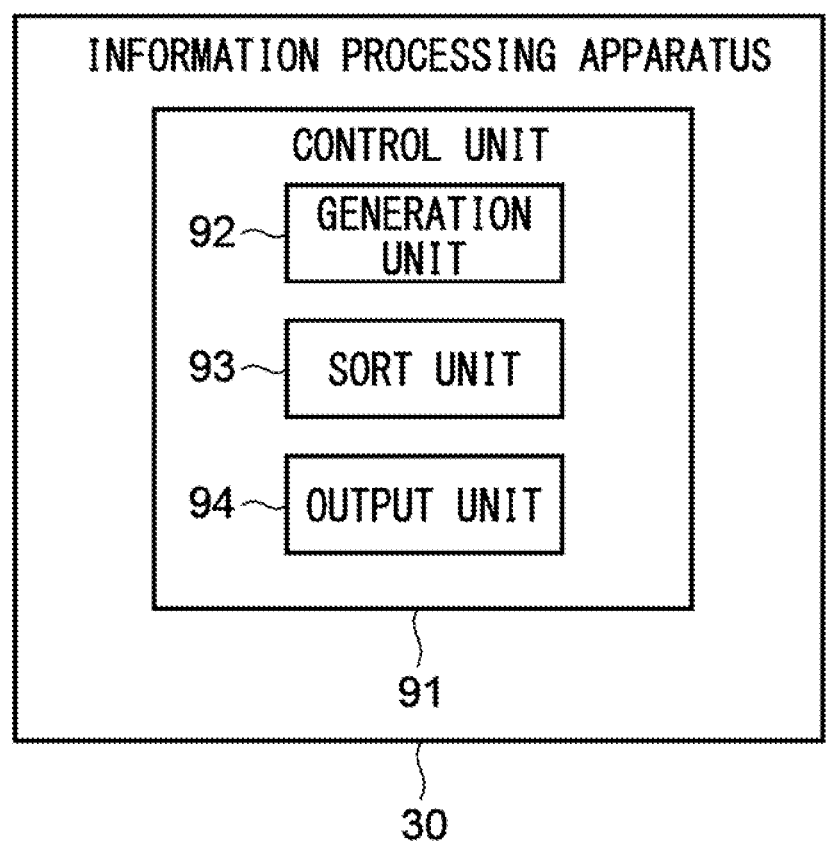
FIG. 25 is a functional configuration diagram of the information processing apparatus according to the second embodiment.

FIG. 25 is a functional configuration diagram of the information processing apparatus 30 according to the present embodiment.

As illustrated in FIG. 25, the information processing apparatus 30 has a control unit 91. The control unit 91 is a processing unit that controls each unit of the information processing apparatus 30, and includes a generation unit 92, a sort unit 93, and an output unit 94. Each of these units is realized by executing the source code 80 (see FIG. 22) of the assembly instruction conversion program 31 in cooperation with the memory 30b and the processor 30c of FIG. 10.

The generation unit 92 is a processing unit that generates the plurality of machine language 85c of the assembly instruction of Armv8-A that executes processing equivalent to the assembly instruction "vpmovsxbd" of x86_64 for each of the plurality of assembly instructions "vpmovsxbd". For example, the information processing apparatus 30 can realize a function of the generation unit 92 by executing the generateJitCode function 34 described in the source code 80.

The sort unit 93 is a processing unit that sorts the machine languages 85c so that the plurality of machine language 85c (see FIG. 23) having the dependency relationship are not arranged adjacent to each other. The sort unit 93 is realized by the reorderJitCode function 83 (see FIG. 22).

As an example, the sort unit 93 identifies the machine languages 85c between the first dummy machine language 85a and the second dummy machine language 85b in the machine language sequence 85. The first and the second dummy machine languages 85a and 85b are not defined in Armv8-A and appear only at a start point and an end point of the sort. Therefore, the sort unit 93 can uniquely identify the start point and the end point of the sort by using the first and the second dummy machine languages 85a and 85b as markers.

Then, the sort unit 93 assigns numbers "0", "1", "2", . . . to the machine languages 85c in order from the machine language 85c next to the first dummy machine language 85a, as illustrated in FIG. 24. Further, the sort unit 93 sorts the respective machine languages 85c so that the even-numbered machine languages 85c appears adjacent to each other and then the odd-numbered machine languages 85c appears adjacent to each other. After that, the sort unit 93 deletes the first dummy machine language 85a and the second dummy machine language 85b.

The output unit 94 is a processing unit that outputs the machine language sequence 85 including the machine languages 85c sorted by the sort unit 93 to the outside.

Figure 26:
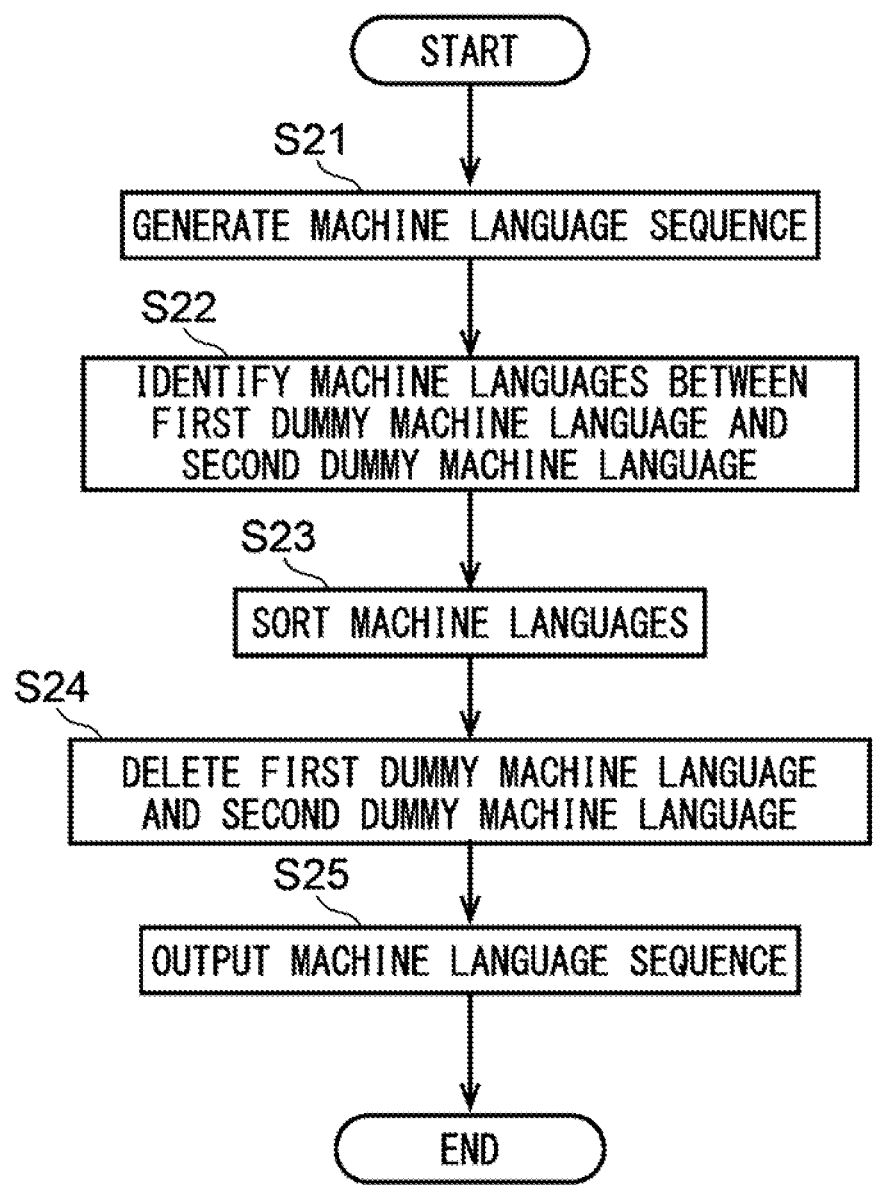
FIG. 26 is a flowchart of the assembly instruction conversion method according, to the second embodiment.

FIG. 26 is a flowchart of the assembly instruction conversion method according to the present embodiment.

First, the generation unit 92 generates the machine language sequence 85 of Armv8-A (step S21). For example, the information processing apparatus 30 can generate the machine language sequence 85 by executing the generateJitCode function 34. Thereby, the plurality of machine languages 85c of the assembly instructions "sxtl" that execute processing equivalent to the assembly instruction "vpmovsxbd" are generated for each of the plurality of assembly instructions "vpmovsxbd".

Next, the sort unit 93 identifies the machine languages 85c between the first dummy machine language 85a and the second dummy machine language 85b (step S22).

Next, the sort unit 93 sorts the identified machine languages 85c (step S23). For example, the sort unit 93 sorts the respective machine languages 85c so that the even-numbered machine languages 85c appears adjacent to each other and then the odd-numbered machine languages 85c appears adjacent to each other as described above.

After that, the sort unit 93 deletes the first dummy machine language 45a and the second dummy machine language 85b (step S24).

Then, the output unit 94 outputs the machine language sequence 85 to the outside (step S25).

This completes the basic processing of the assembly instruction conversion method according to the present embodiment. In another assembly instruction of x86_64 other than the assembly instruction "vpmovsxbd", the number of assembly instructions of Armv8-A that execute the processing equivalent to the another assembly instruction may be three, for example. In this case, the sort unit 93 may calculate remainders when the numbers "0", "1", "2", . . . assigned to the machine languages 85c are divided by "3", and may sort the machine languages 85c so that the same remainders appear adjacent to each other. For example, the sort unit 93 may sort the respective machine languages 85c in an order that the machine languages 85c having the remainder "0" appear adjacent to each other, then the machine languages 85c having the remainder "1" appear adjacent to each other, and finally the machine language 85c having the remainder "2" appears adjacent to each other. Thus, the present embodiment can also be applied when the assembly instruction of x86_64 is realized by N assembly instructions of Armv8-A (N is a natural number of 3 or more).

According to the present embodiment described above, the sort unit 93 sorts the machine languages 85c so that the machine languages 85c of the assembly instructions having the dependency relationship are not arranged adjacent to each other, as illustrated in FIG. 24. Thereby, the stall does not occur even when the pipeline processing of the respective machine languages 85c is executed, and hence it is possible to suppress the increase in the number of clock cycles when the second target machine 20 executes processing equivalent to the assembly instruction "vpmovsxbd" of x86_64.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A non-transitory computer-readable medium having stored therein a program for causing a computer to execute a process, the process comprising:
    storing a plurality of generation instructions in a storage area for each of a plurality of first assembly instructions, each generation instruction instructing the generation of a machine language of a second assembly instruction that executes processing equivalent to each first assembly instruction; and
    generating machine languages of a plurality of second assembly instructions so that the machine languages of the second assembly instructions having a dependency relationship do not appear adjacent to each other, according to the plurality of generation instructions in the storage area.

2. The non-transitory computer-readable medium as claimed in claim 1, wherein
    the first assembly instruction is an assembly instruction included in a first instruction set, and
    the second assembly instruction is an assembly instruction included in a second instruction set different from the first instruction set.

3. The non-transitory computer-readable medium as claimed in claim 2, wherein
    the generation instructions are stored in the storage area by calling a function a plurality of times, where a register of the first instruction set corresponding to a register of the second instruction set is specified as an argument of the function, while changing the resister specified as the argument every time the function is called.

4. The non-transitory computer-readable medium as claimed in claim 1, wherein
    the dependency relationship indicates a relationship in which the second assembly instructions use a same register.

5. The non-transitory computer-readable medium as claimed in claim 4, wherein
    the processing equivalent to the first assembly instruction is executed by the plurality of second assembly instructions that use the same register specified in an operand.

6. The non-transitory computer-readable medium as claimed in claim 3, wherein the machine language is generated for each of a plurality of groups, each group including the plurality of second assembly instructions that use mutually different registers.

7. The non-transitory computer-readable medium as claimed in claim 1, wherein
the storage area is a FIFO (First In First Out) buffer, and
the generating the machine languages is performed in order from the generation instruction first stored in the FIFO buffer among the generation instructions.

8. A non-transitory computer-readable medium having stored therein a program for causing a computer to execute a process, the process comprising:
generating a plurality of machine languages of a plurality of second assembly instructions for each of a plurality of first assembly instructions, the plurality of second assembly instructions executing processing equivalent to each first assembly instruction; and
sorting the plurality of machine languages so that the machine languages of the second assembly instructions having a dependency relationship do not appear adjacent to each other.

9. The non-transitory computer-readable medium as claimed in claim 8, wherein
the sorting the plurality of machine languages is executed when a first dummy function described before a function generating the machine languages and a second dummy function described after the function are detected.

10. The non-transitory computer-readable medium as claimed in claim 9, wherein
each of the first assembly instructions is an assembly instruction included in a first instruction set,
each of the second assembly instructions is an assembly instruction included in a second instruction set different front the first instruction set, and
each of the machine language of the first dummy function and the machine language of the second dummy function is not defined in the second instruction set.

11. An assembly instruction conversion method for causing a computer to execute a process, the process comprising:
storing a plurality of generation instructions in a storage area for each of a plurality of first assembly instructions, each generation instruction instructing the generation of a machine language of a second assembly instruction that executes processing equivalent to each first assembly instruction; and
generating machine languages of a plurality of second assembly instructions so that the machine languages of the second assembly instructions having a dependency relationship do not appear adjacent to each other, according to the plurality of generation instructions in the storage area.

12. An information processing apparatus comprising:
a memory including a storage area;
a processor coupled to the memory, and the processor configured to:
store a plurality of generation instructions in a storage area for each of a plurality of first assembly instructions, each generation instruction instructing the generation of a machine language of a second assembly instruction that executes processing equivalent to each first assembly instruction; and
generate machine languages of a plurality of second assembly instructions so that the machine languages of the second assembly instructions having a dependency relationship do not appear adjacent to each other, according to the plurality of generation instructions in the storage area.

\* \* \* \* \*